(12) United States Patent
Warren et al.

(10) Patent No.: US 7,167,103 B2
(45) Date of Patent: Jan. 23, 2007

(54) TRANSPORT NODE APPARATUS

(76) Inventors: Bradford S. Warren, 7202 McNeil Dr. Ste. 104, Austin, TX (US) 78729; Martin R. Soetaert, 7612 Alcorn Mountain Trail, Austin, TX (US) 78729; Alan L. Bartlett, 4415 River Oaks, New Braunfels, TX (US) 78132

( * ) Notice: Subject to any disclaimer, the term of this patent is extended or adjusted under 35 U.S.C. 154(b) by 409 days.

(21) Appl. No.: 10/461,124

(22) Filed: Jun. 13, 2003

(65) Prior Publication Data

US 2004/0025390 A1 Feb. 12, 2004

Related U.S. Application Data

(60) Provisional application No. 60/388,532, filed on Jun. 13, 2002, provisional application No. 60/419,889, filed on Oct. 21, 2002.

(51) Int. Cl.
*G08G 1/00* (2006.01)

(52) U.S. Cl. ............. 340/901; 340/994; 307/10.1; 40/124.02; 40/124.06; 40/368; 40/369; 40/370; 362/183; 362/431

(58) Field of Classification Search ............ 340/901, 340/994; 307/10.1; 40/124.02, 124.06, 40/368, 369, 370; 362/183, 431
See application file for complete search history.

(56) References Cited

U.S. PATENT DOCUMENTS

| | | | |
|---|---|---|---|
| 698,942 A | 4/1902 | Harrison |
| 743,789 A | 11/1903 | Wrenn |
| 3,654,716 A | 4/1972 | Moss |
| 3,962,806 A | 6/1976 | Eby |
| 3,986,284 A | 10/1976 | Plantinga |
| 4,082,029 A * | 4/1978 | Rumer et al. ............ 84/484 |
| 4,329,801 A | 5/1982 | Clausen |
| 4,347,678 A | 9/1982 | Laakso |
| 4,353,179 A | 10/1982 | Jennings |
| 4,953,067 A | 8/1990 | Moore |
| 5,054,219 A | 10/1991 | Hoyt et al. |
| 5,116,204 A | 5/1992 | Power et al. |

(Continued)

FOREIGN PATENT DOCUMENTS

WO   WO 02/086977 A1   10/2002

OTHER PUBLICATIONS

Solar Lights at Long Beach Stops, http://web.archive.org/web20001019235746/solarlighting/transit1.htm (Nov. 10, 1999).

*Primary Examiner*—Jeffery Hofsass
*Assistant Examiner*—Edny Labbees
(74) *Attorney, Agent, or Firm*—Eric W. Cernyar

(57) ABSTRACT

A transit center apparatus is provided having one or more modules attachable to a transit stop pole to provide one or more of the following conveniences to a transit stop patron: information in an optionally illuminated modular display apparatus, overhead illumination, video camera surveillance, and wireless communication. These conveniences are preferably provided through an overhead assembly and a rugged information display case. The overhead assembly houses one or more of the group consisting of solar cells, a rechargeable battery pack, overhead lights, a cell phone antenna, camera, and related circuitry. The information display case provides backlighting and houses a switch assembly. The display case is preferably constructed from extruded, interlocking aluminum frame members and is easily installable on existing support poles.

18 Claims, 19 Drawing Sheets

U.S. PATENT DOCUMENTS

| | | |
|---|---|---|
| 5,149,188 A * | 9/1992 | Robbins ................. 362/183 |
| 5,168,451 A * | 12/1992 | Bolger .................. 701/117 |
| 5,400,020 A * | 3/1995 | Jones et al. ............ 340/994 |
| 5,606,815 A | 3/1997 | Feldwhere |
| 5,704,145 A | 1/1998 | Hanitz |
| 5,782,552 A | 7/1998 | Green et al. |
| 6,013,985 A | 1/2000 | Green et al. |
| 6,250,003 B1 | 6/2001 | Phinney |
| 6,308,444 B1 * | 10/2001 | Ki ....................... 40/546 |
| 6,345,458 B1 | 2/2002 | Garibian |
| 6,355,989 B1 | 3/2002 | Westcott |
| 6,374,176 B1 * | 4/2002 | Schmier et al. ......... 701/200 |
| 6,621,177 B2 * | 9/2003 | Westcott ............... 307/10.1 |
| 2002/0053153 A1 * | 5/2002 | Nesbitt et al. ........... 40/607 |
| 2002/0057212 A1 | 5/2002 | Hamilton et al. |
| 2002/0069017 A1 | 6/2002 | Schmier et al. |
| 2002/0099500 A1 | 7/2002 | Schmier et al. |
| 2002/0145540 A1 | 10/2002 | Westcott |
| 2005/0043885 A1 * | 2/2005 | Amlinger ............... 701/204 |

* cited by examiner

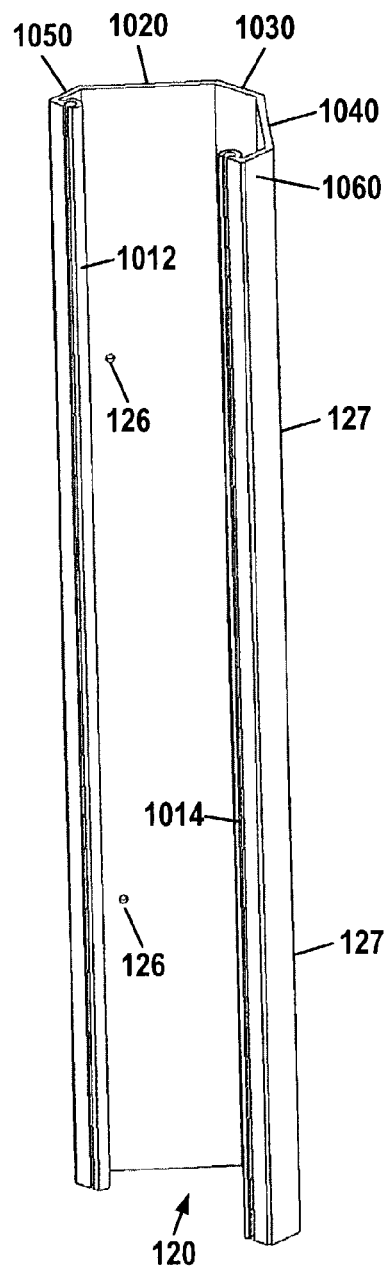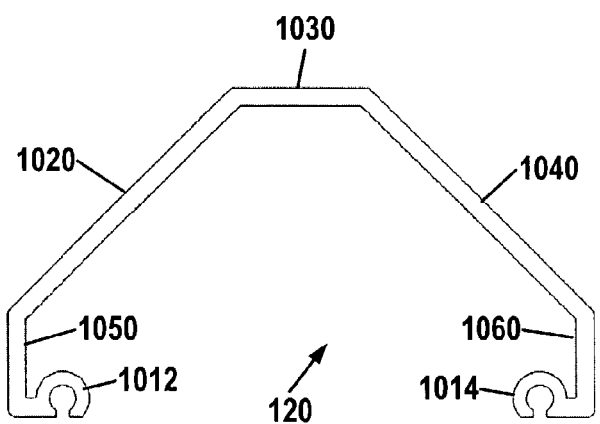
FIG. 10
FIG. 9

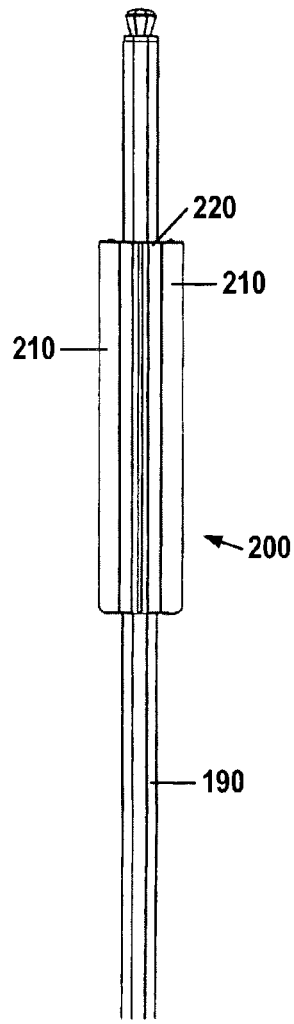
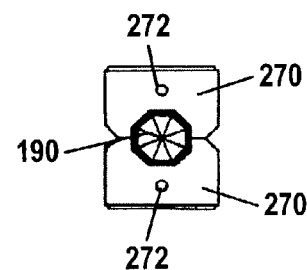
FIG. 20
FIG. 21

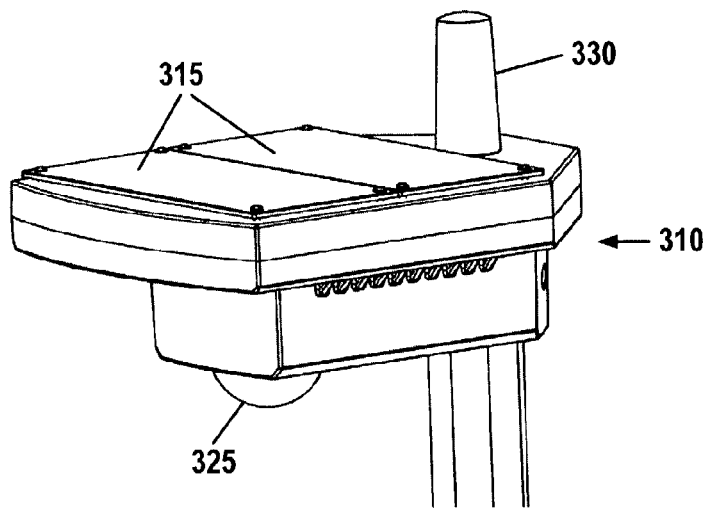
FIG. 26
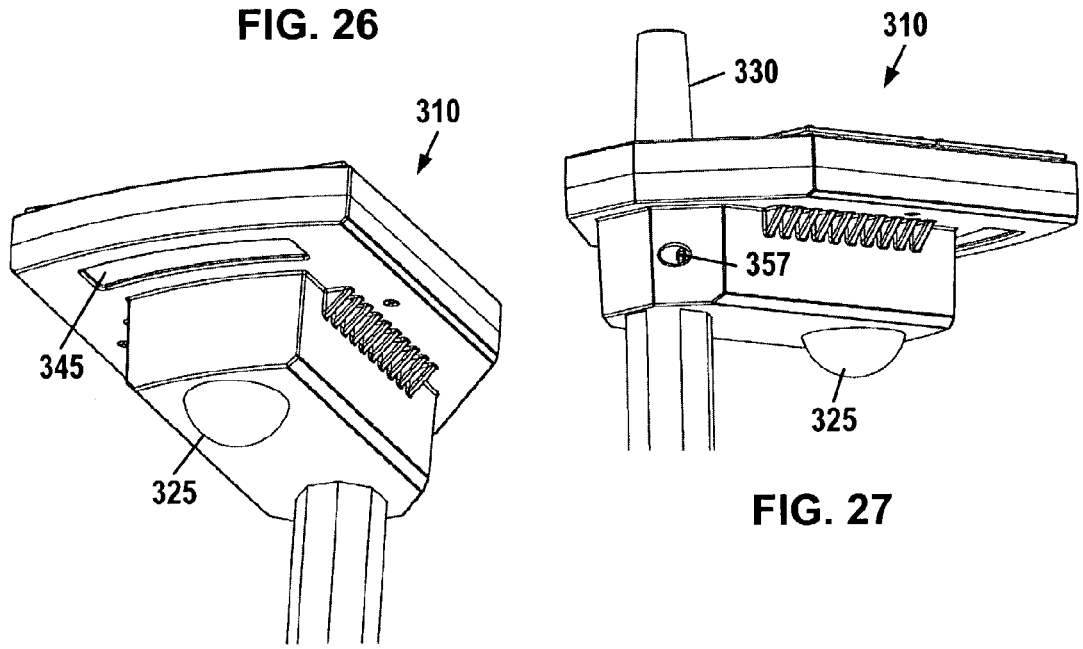
FIG. 27
FIG. 28

TRANSPORT NODE APPARATUS

RELATED APPLICATION INFORMATION

This Application claims the benefit of U.S. Provisional Patent Application Ser. No. 60/388,532 entitled INFORMATION DISPLAY APPARATUS filed Jun. 13, 2002; and U.S. Provisional Patent Application Ser. No. 60/419,889 entitled TRANSPORTATION NOTIFICATION, EMERGENCY RESPONSE, AND SURVEILLANCE SYSTEM filed by Alan L. Bartlett on Oct. 21, 2002, both of which are herein incorporated by reference.

FIELD OF THE INVENTION

This invention relates to modules intended to provide conveniences to patrons at a transit node or center, such as a bus stop. More particularly, the present invention relates to one or more modules installed at a transit stop location that provide one or more of the following conveniences to a transit stop patron: information in an optionally illuminated modular display apparatus, overhead illumination, video camera surveillance, and wireless communication.

BACKGROUND

Public transportation is underutilized in many developed countries, especially the United States. Unattractive and poorly lit or unlit transit stops contribute to negative perceptions about public transportation in general. Thoughts of sitting on a bench in public in a bad part of town in the midst of strangers often provoke fears over personal safety. Lack of information regarding scheduled bus arrivals and drive-bys contribute to public frustrations over public transportation. Accordingly, there is a need for an attractive and economical transit center apparatus to increase community acceptance and ridership of public transportation.

SUMMARY OF THE INVENTION

Accordingly, the present invention provides an apparatus for installation at a transportation or transit node (such as a bus stop, taxi cab pickup location, or any other pickup location for a transportation system). The apparatus comprises one or more modules attachable to a transit stop pole, shelter, or other support structure. The modules provide one or more of the following conveniences to a transit stop patron: information in an optionally illuminated modular display apparatus, overhead illumination, video camera surveillance, and wireless communication.

In one embodiment of the invention, a display apparatus is provided comprising one or more display panels and a plurality of interlocking extruded aluminum frame members adapted to wrap around a support member. A first interlocking frame member has a male connector and a second interlocking frame member has a corresponding female connector. The first interlocking frame member is adapted to interlock with the second interlocking frame member by inserting the male connector into the female connector. One or more of the plurality of interlocking frame members include compartments for holding the display panels. In one embodiment of the display apparatus, two of the interlocking frame members include compartments for holding the display panels.

The male and female connectors each have an elongate longitudinal dimension extending from a point at or near the top of the corresponding frame member to a point at or near the bottom of the corresponding frame member, so that the first interlocking frame member is adapted to be connected to the second interlocking frame member by sliding the male connector into the female connector along a longitudinal axis of the display apparatus.

The display apparatus also includes a support bracket dimensioned to partially wrap around, press against, and frictionally engage the support member when fastened to an interlocking frame member. The support bracket has a set of fastener passages dimensioned to align with another set of fastener passages in one of the interlocking frame member. A plurality of fasteners are inserted through these two sets of fastener passages to join the support bracket to the interlocking frame member in which said set of fastener passages is disposed. When fastened, movement of the display apparatus with respect to the support member is impeded.

The display apparatus further includes means for illuminating the display panels. In one embodiment, a plurality of parallel and linear channel grooves are disposed on a surface of the display panels. A process of scratching the display panel surface with a blade forms the channel grooves, which extend from the bottom to the top of the display panel. In particular, this groove-crating process is initiated at a first end of the display panel and terminated at the opposite end, so that the creation of each groove is initiated from the same first end.

In another embodiment, a pattern of regularly spaced thin parallel strips of light-diffusing material (such as ink or paint) is applied, via a silk-screen process, to the inside surface of the display panel. The strips extend from the top edge to the bottom edge of the display panel.

Another embodiment of the invention comprises a post; an overhead assembly mounted on the post; one or more light emitters mounted within the overhead assembly and oriented to project the emitted light toward the ground in the immediate vicinity of the transit stop apparatus; a rechargeable battery; a solar energy collector; a user-operated switch mounted on the post that enables a user to activate the light emitters; and electrical circuitry connecting the solar energy connector, switch, the rechargeable battery, and the light emitters in a manner adapted to allow the light emitters to be turned on upon user activation of the switch and to allow the solar energy collector to recharge the battery. This embodiment optionally also comprises a light control circuit operatively connected to the switch, battery, and light emitters, and programmed to turn off the light emitters after a finite period of illumination has elapsed. In another optional feature of this embodiment, the light control circuit detects ambient illumination from the solar energy connector and prevents activation of the light emitters when the ambient illumination exceeds a predetermined threshold.

This embodiment optionally, but not necessarily, also includes a display panel mounted on the post, the display panel being adapted to provide transportation-related information to persons at the transit stop; a second set of one or more light emitters mounted inside the display panel and oriented to illuminate the display panel; and a display light activation switch; wherein the switches are mounted on the display panel and wherein the electrical circuitry connects the display light activation switch, the second light emitter set, and the rechargeable battery in a manner adapted to turn on the second light emitter set and thereby illuminate the display panel.

The embodiment alternatively or optionally additionally includes a flashing light switch mounted on the post; and a light control circuit programmed to flash the light emitters on and off repeatedly for a finite period of time; wherein the electrical circuitry connects the flashing light switch, the light control circuit, and the light emitters in a manner adapted to cause the light emitters to be flashed on and off upon user activation of the flashing light switch.

The embodiment alternatively includes a transportation driver signaling switch mounted on the post and a transportation signaling transmitter operable to broadcast an invisible wireless signal to a receiver (such as a pager) mounted on a transportation vehicle, wherein the electrical circuitry connects the transportation driver signaling switch with the transportation signaling transmitter to enable a user to transmit a signal to a driver of a transportation vehicle and thereby alert the driver that the user is waiting to be picked up.

The embodiment alternatively or optionally additionally includes a wireless two-way voice transceiver; an antenna for receiving and transmitting signals to and from the transceiver; and a communication link switch mounted on the post that enables a user to activate the wireless two-way voice transmitter and receiver; wherein the electrical circuitry connects the rechargeable battery, transceiver, communication link switch, and antenna in a manner adapted to enable two-way communication upon user activation of the communication link switch.

Yet another embodiment of the invention comprises a post; an overhead assembly mounted on an upper portion of the post; a display assembly mounted on the post below the overhead assembly, the display assembly providing a display surface for displaying information; at least one light emitter mounted on the display assembly and oriented to cast light upon the display surface of the display assembly; a rechargeable battery operable to provide power to the at least one light emitter; a solar panel mounted on the overhead assembly operable to recharge the battery; and electrical circuitry connecting the solar panel, rechargeable battery, and light emitter in a manner adapted to enable illumination of the display panel.

This alternative embodiment preferably further comprises a transparent display panel having an inside surface and an outside surface, the transparent display panel being mounted in the display assembly, and a thin, light-diffusing translucent sheet with printed information, the translucent sheet overlaying the outside surface of the transparent display panel; wherein the at least one light emitter is oriented along an edge of the display panel to project light into the transparent display panel. Furthermore, it is preferred for the transparent display panel to have highly polished top and bottom edges. Furthermore, it is preferred that a pattern of regularly spaced thin parallel strips of light-reflecting material be affixed to the inside surface of the display panel and extend between the top and bottom edges of the display panel.

This alternative embodiment preferably further comprises a second set of light emitters mounted within the overhead assembly and oriented to project the emitted light toward the ground in the immediate vicinity of the transit stop apparatus and a user-operated switch mounted on the display panel that enables a user to activate the second set of light emitters; wherein the electrical circuitry also connects the rechargeable battery, the second set of light emitters, and the user-operated switch in a manner adapted to allow the second set of light emitters to be turned on upon user activation of the switch.

This alternative embodiment optionally also comprises a second user-operated switch mounted on the display assembly; and a light control circuit programmed to flash the second set of light emitters on and off repeatedly for a finite period of time; wherein the electrical circuitry connects the second user-operated switch, the light control circuit, and the second set of light emitters in a manner adapted to cause the light emitters to be flashed on and off upon user activation of the second user-operated switch.

This alternative embodiment also optionally comprises a transportation signaling device mounted in the overhead apparatus and operable to provide a signal to a driver of a transportation vehicle and a user-operated switch mounted on the display apparatus; wherein the electrical circuitry connects the user-operated switch with the transportation signaling device to enable a user to alert a driver of a transportation vehicle that the user is waiting to be picked up.

The alternative embodiment also optionally comprises a camera mounted in the overhead assembly and operable to capture images of the area below the overhead assembly and in the immediate vicinity of the transit stop apparatus and a wireless communication circuit coupled to the camera and operable to transmit images captured by the camera.

These and other aspects, features, and advantages of the present invention will be readily apparent to those skilled in the art from the following detailed description taken in conjunction with the annexed sheets of drawings, which illustrate the invention.

BRIEF DESCRIPTION OF THE DRAWINGS

FIG. 9 is a perspective view of the back cover frame member of the single-sided display case of FIG. 1.

FIG. 10 is a cross-section of the back cover frame member of FIG. 9.

FIG. 20 is a side view of the double-sided display case of FIG. 18.

FIG. 21 is a top-end view of the double-sided display case of FIG. 17.

FIG. 26 is an elevated frontal perspective view of the overhead light assembly of FIG. 24.

FIG. 27 is a posterior perspective view of the overhead light assembly of FIG. 26.

FIG. 28 is a bottom-up frontal perspective view of the overhead light assembly of FIG. 26.

DETAILED DESCRIPTION

Figure 1:
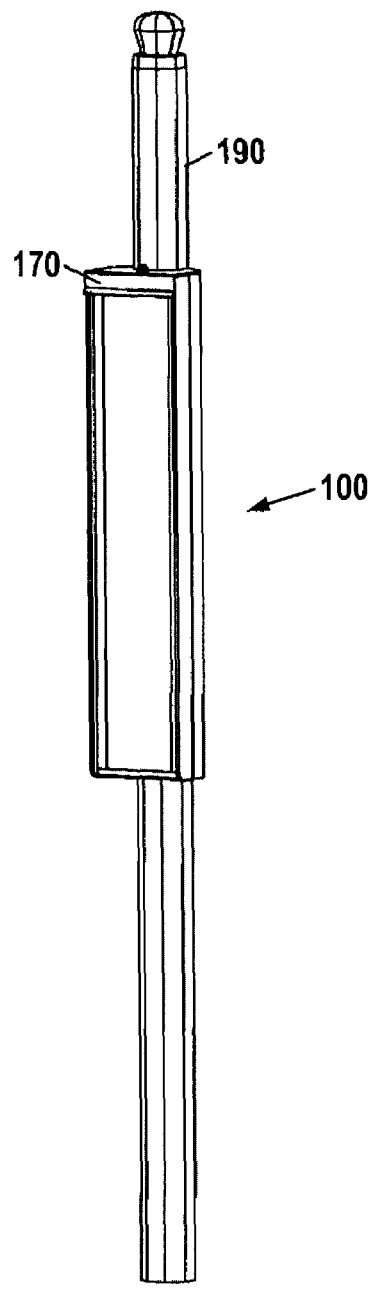
FIG. 1 is a perspective view of one embodiment of a single-sided display case built in accordance with the present invention.
Figure 2:
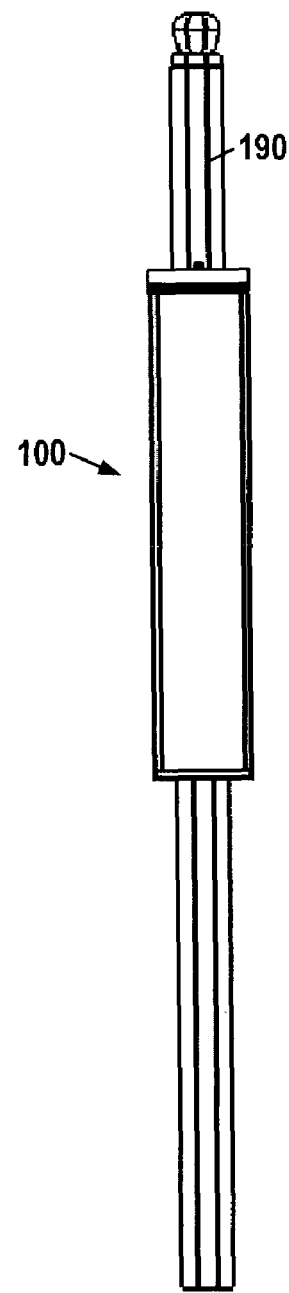
FIG. 2 is a front-end view of the single-sided display case of FIG. 1.
Figure 3:
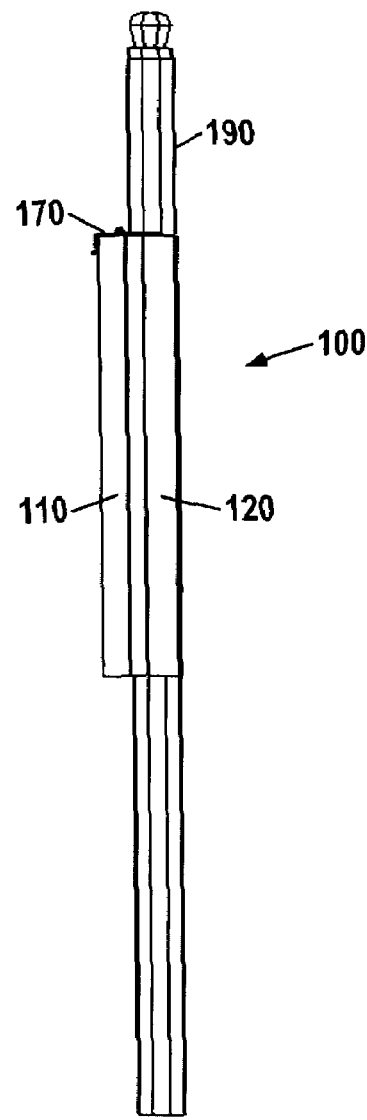
FIG. 3 is a side view of the single-sided display case of FIG. 1.
Figure 4:
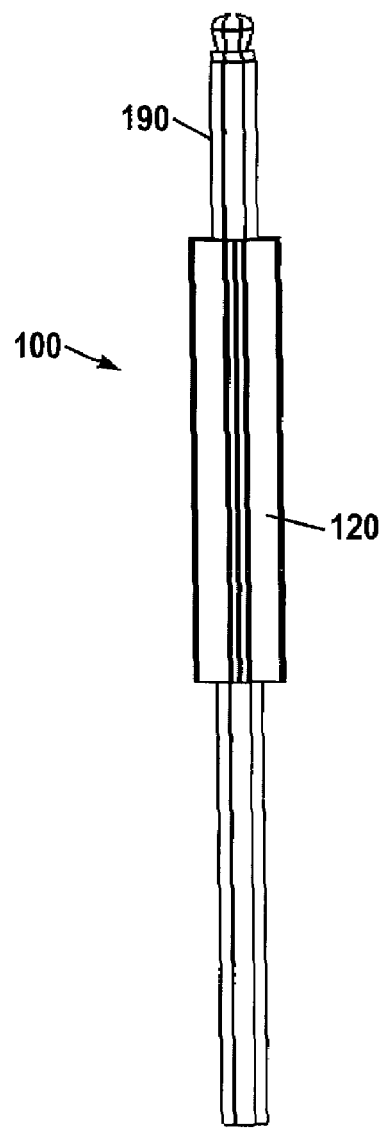
FIG. 4 is a rear-end view of the single-sided display case of FIG. 1.
Figure 5:
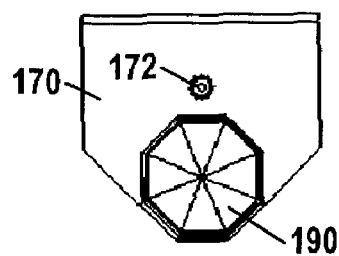
FIG. 5 is a top-end view of the single-sided display case of FIG. 1.
Figure 6:
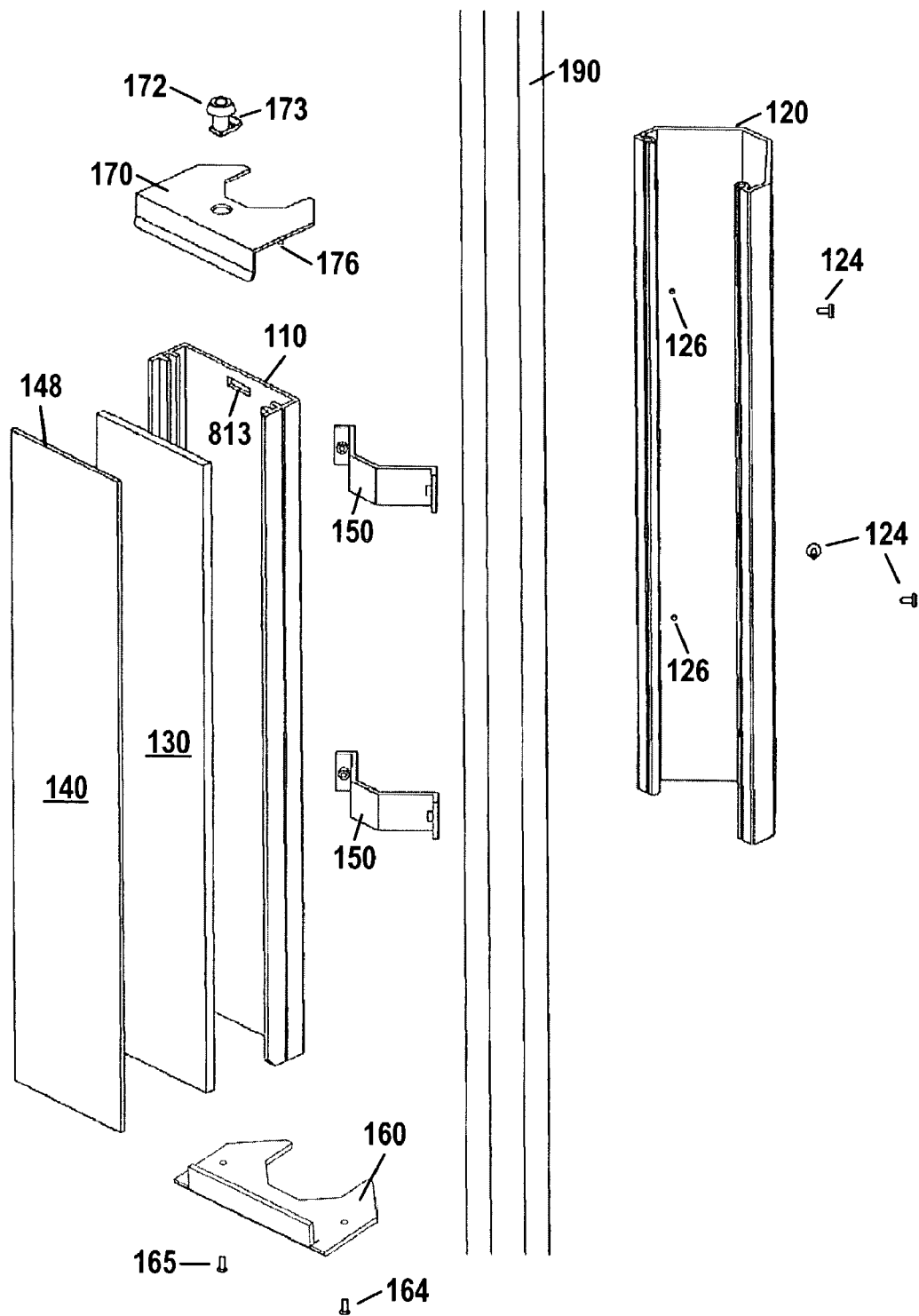
FIG. 6 is an exploded perspective view of the single-sided display case of FIG. 1.

Co-pending U.S. application Ser. No. 09/867,143, filed May 29, 2001, for a rotating information display case, provides one embodiment of an information display apparatus that addresses the need for an aesthetically pleasing and multi-functional display information display apparatus that can be readily installed on existing supports. This application describes several alternative embodiments that address many of the same needs. It will be understood that many of the aspects and features of U.S. application Ser. No. 09/867,143 may be combined with the aspects and features described below, even if not specifically described herein. Accordingly, that application is herein incorporated by reference for all purposes.

Based on the description and illustrations provided herein, the many benefits provided by the invented structure and methods of utilization are apparent. These described benefits, as well as those that are inherent to those skilled in the art, fall within the scope of the invention of the present patent application as limited only by the claims appended hereto.

FIGS. 1–17 illustrate several embodiments of a single-sided information display assembly or display case 100 designed and assembled in accordance with the present invention. Display assembly 100 comprises two interlocking frame members 110 and 120, a display panel 130, a window panel 140, two support brackets 150, a bottom cover 160, and a top plate or lid 170.

Figure 7:
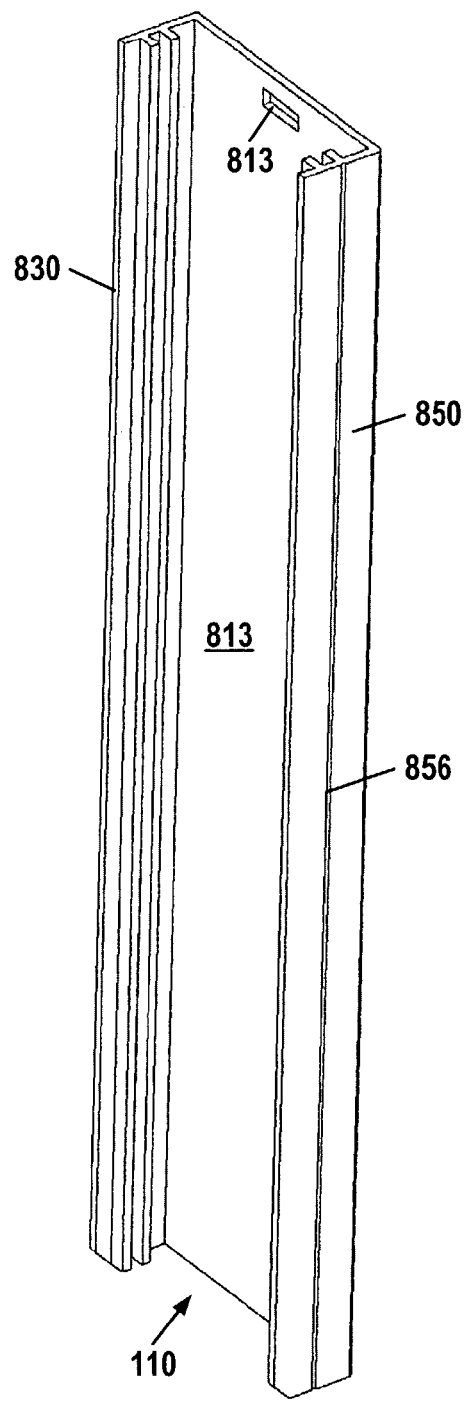
FIG. 7 is a perspective view of the sign body frame member of the single-sided display case of FIG. 1.
Figure 8:
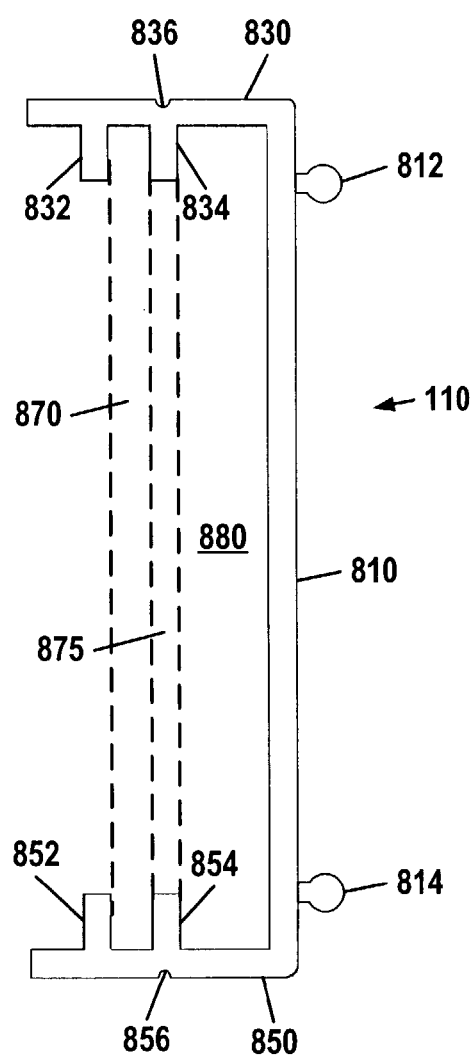
FIG. 8 is a cross-section of the sign body frame member of FIG. 7.
Figure 11:
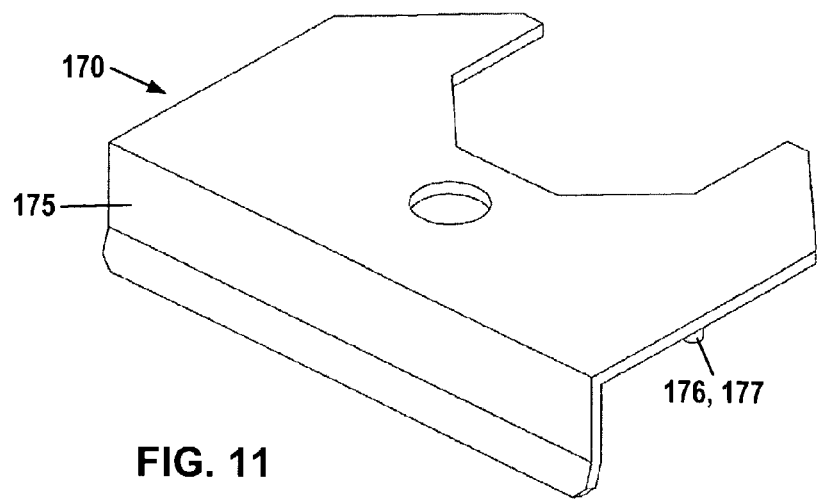
FIG. 11 is a perspective view of the lid of the single-sided display case of FIG. 1.
Figure 12:
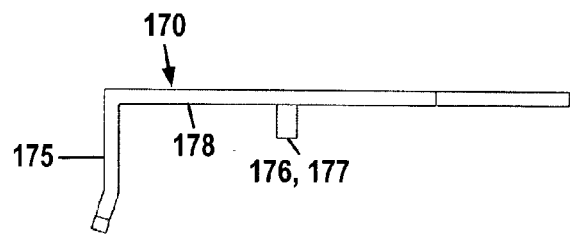
FIG. 12 is a cross-sectional side view of the lid of FIG. 11.
Figure 13B:
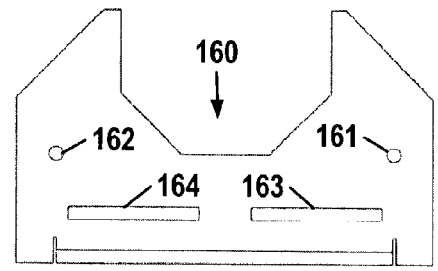
FIG. 13B is a top view of the bottom cover of FIG. 13A.
Figure 13A:
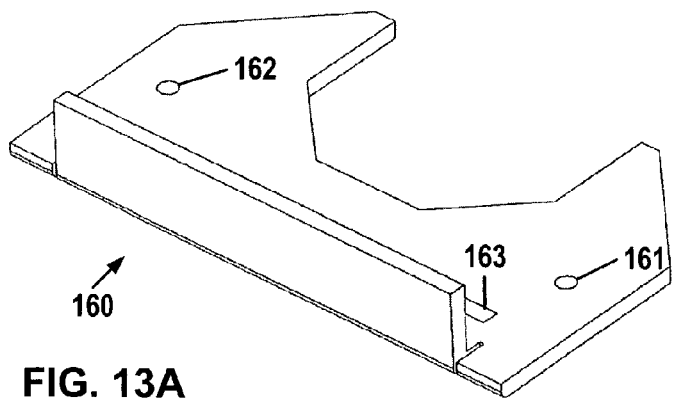
FIG. 13A is a perspective view of the bottom cover of the single-sided display case of FIG. 1.

Front frame member 110, shown in greatest detail in FIGS. 7–8, comprises a substantially planar back portion 810 and two integral and substantially planar side walls 830, 850 extending at right angles from the longitudinal edges of back portion 810. Two flanges 832, 834, each approximately ⅛ inch thick and extending along most of the length of frame member 110, project inwardly from the sidewall 830, parallel to the back portion 810, for a distance of about ¼ inch. Likewise, two similarly dimensioned flanges 852, 854 opposite flanges 832, 834 project inwardly from sidewall 850. A gap or window compartment 870 of approximately 0.177 inches exists between the flanges 832 and 834, and likewise, between 852 and 854, for inserting the window panel 140. Another gap or display compartment 880 of approximately 0.41 inches exists between the flanges 834 and 854 and the back portion 810 for inserting the display panel 130 and display graphics.

Two semi-cylindrical knob-like male connectors 812, 814 project outwardly from the planar back portion 810. The knob-like portion of the connectors 812, 814 have a radius of approximately 0.085 inches. Connectors 812, 814 preferably extend along most of the length (i.e., from about one inch from the top to about one inch from the bottom) of the frame member 110. The planar sided portions 830, 850 also include aesthetically pleasing grooves 836, 856 extending along the length of frame member 110.

Rear interlocking frame member 120, shown in greatest detail in FIGS. 9–10, comprises one or more surface portions 1020, 1030, and 1040 configured to engage corresponding surface portions of a support member or post 190. Rear interlocking frame member 120 also comprises side extensions 1050 and 1060 adapted to reach around the sides of support 190 and engage the back portion 810 of the front frame member 110. Two female socket connectors 1012, 1014 project inwardly from the side extensions 1050 and 1060. Connectors 1012, 1014 extend along the entire length (i.e., from top to bottom) of the rear frame member 120. The connectors 1012, 1014 are dimensioned and shaped to interlock with the front frame member's male connectors 812, 814. In particular, the semi-cylindrical apertures formed within connectors 1012, 1014 have radii of approximately 0.105 inches. This interlocking assembly enables frame members 110 and 120 to be fastened together to form a durable and strong self-supporting assembly.

In a preferred embodiment, interlocking frame members 110 and 120 are formed of extruded aluminum, in particular, 6061-T3 extruded aluminum. While such materials are presently preferred because of their cost, durability, and other characteristics, other fabrication materials, such as extruded plastics, can be used without deviating from the full scope of the present invention.

Interlocking frame members 110 and 120 can be fashioned to have any suitable length or width. When used as bus stop displays, frame members 110 and 120 have a preferred length of about 2 feet and a preferred width of between about 3½ inches, particularly for narrow support members 190, and 6 inches, which is suitable for wider support members 190 or for displaying greater amounts of information. A narrow and relatively slim sign profile is preferred so that the display apparatuses 100 minimally obstruct the view of the surrounding environment and to minimize dangers to pedestrians in high-traffic areas.

The display panel 130 provides the surface for displaying information. When inserted in the front frame member 110, the display panel 130 is secured by and between flange members 834 and 854 and the back portion 810. In one embodiment, the display panel 130 comprises a relatively stiff base material, such as cardboard or white polyvinyl chloride (PCV) plastic, on which the information to be displayed is printed or overlaid. For non-illuminated display panels 130, PCV white is preferred because it functions as a background color for transparent graphics.

In another embodiment, described in detail in connection with FIG. 23 below, the display panel 130 comprises an illuminated glassy thermoplastic, such as an edge-lit acrylic, affixed to or overlaid by a waterproof light-diffusing paper on which the information is printed. In yet another embodiment, the surface of display panel 130 includes a photoluminescent material that illuminates the display for night viewing, such as the materials described in U.S. Pat. No. 6,395,408 to Nelson, U.S. Pat. No. 6,364,498 to Burbank, and U.S. Pat. No. 6,207,077 to Burnell-Jones, all of which are herein incorporated by reference. A photoluminescent material suitable for use with the present invention is DALITE-50™, which is sold by Datrex located in Kinder, La. The DALITE-50™ material is comprised of flexible laminated film coated with permanent acrylic pressure sensitive adhesive and backed with poly-coated release liner. This photoluminescent material is advertised to glow for as long as 24 hours. Other panel materials suitable for use with the present invention, and well known in the art, include those materials providing frosted, clear, or translucent white panels.

The window panel 140 is preferably comprised of polycarbonate material or tempered glass. It is preferable to utilize a material that is less likely to break or shatter because of its use in public. When inserted in the front frame member 110, the window panel 140 is secured by and between flange members 832, 834, 852 and 854. The window panel 140 may also include Braille lettering to enable sight impaired sign users to better navigate the routes on which the sign is placed.

The window panel 140 is preferably of a length slightly less than that of the front frame member 110. Therefore, when the window panel 140 is installed in the frame member 110, a ventilation port is formed between the top edge 148 of the window panel 140 and the inside planar surface 178 of top plate 170. It will be observed when the display apparatus 100 is fully assembled, flanges 834 and 854 create a display cavity 875 approximately ⅛ of an inch in depth between the window panel 140 and display panel 130. The ventilation port, which is in fluid communication with the display cavity 875, facilitates convection venting of the display cavity 875 to prevent fogging of the inside surface of window panel 140. Ventilation is further aided by ventilation slots 163 and 164 in the bottom cover 160 of the display apparatus 100, which is described in greater detail below in connection with FIG. 13.

Figure 14:
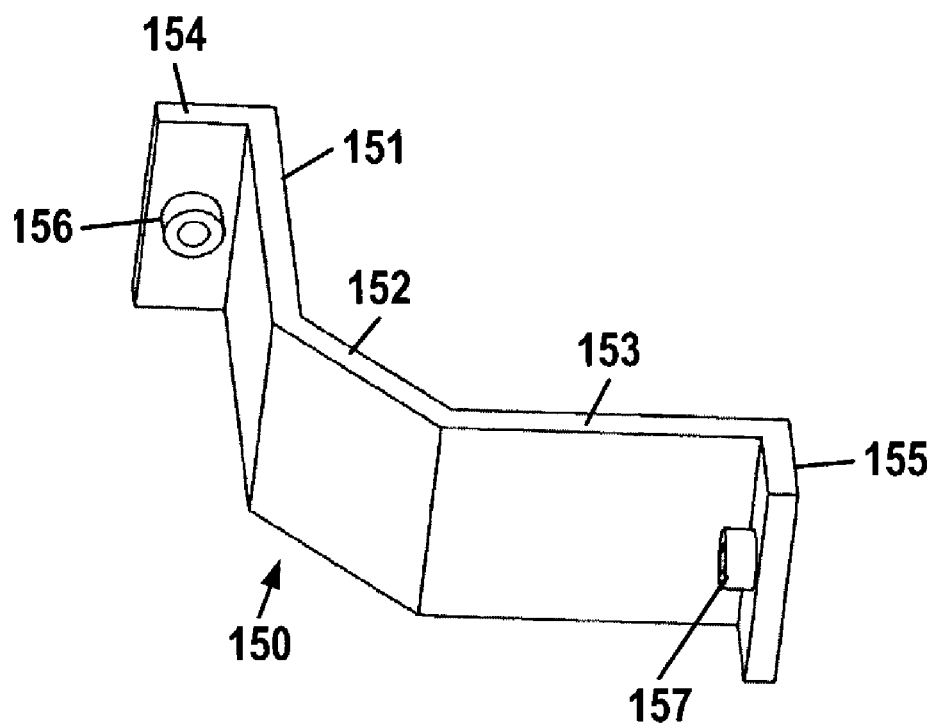
FIG. 14 is a perspective view of the support bracket of the single-sided display case of FIG. 1.
Figure 15:
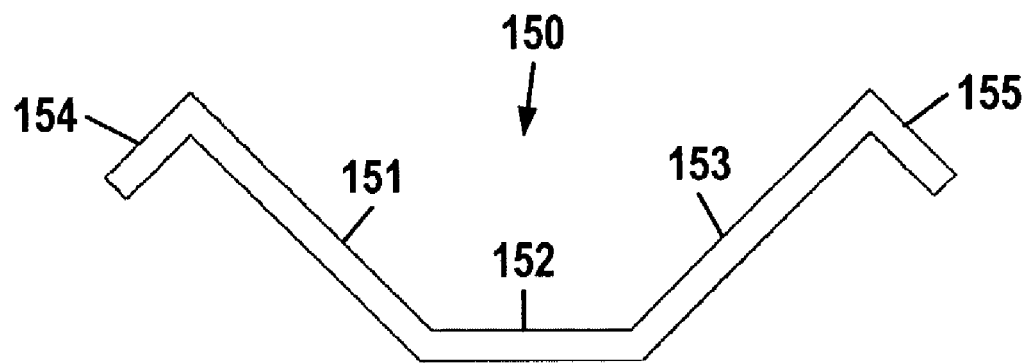
FIG. 15 is a cross section of the support bracket of FIG. 14.

The support brackets 150, shown in greatest detail in FIGS. 14–15, function as internal friction clamps to mount the rear interlocking frame member 120 to the support member 190. The support bracket 150 includes one or more substantially planar portions 151, 152 and 153 configured to engage one or more corresponding surface portions of support member 190. The support bracket 150 also includes two end portions 154, 155 each having a fastener passage 156, 157. The rear interlocking frame member 120 has corresponding fastener passages 126, 127. To secure the support bracket 150 to the frame member 120, fasteners 124, preferably clamp bolts, are inserted through the support bracket's fastener passages 156, 157 and through the rear interlocking frame member's corresponding fastener passages 126, 127. In this manner, the display apparatus 100 is installable on an existing support member 190 and supportable by frictional engagement, eliminating any need to drill holes into the existing support member 190.

In one embodiment of the present invention, the support brackets 150 are configured to deform the rear interlocking frame member 120 when tightened against the support member 190. The deformation is significant enough to prevent disengagement of the front interlocking frame member 110 from the rear interlocking frame member 120. Accordingly, in this embodiment it is important, before installing the front interlocking frame member 110 onto the rear interlocking frame member 120, to refrain from overtightening the fasteners 124. Of course, the fasteners 124 should be tightened after the front interlocking frame member 110 has been installed to prevent its disengagement from the rear interlocking frame member 120, as well as to prevent vertical movement of the display apparatus 100 with respect to the support member 190.

Support brackets 150 are preferably fabricated from sheet steel. However, other materials may be used without deviating from the scope of the invention. For example, the support brackets 150 can be fabricated from plastic, nylon, or other like material.

Figure 16:
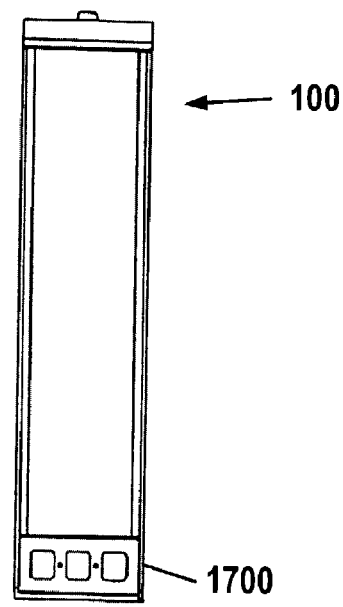
FIG. 16 is a front-end view of another embodiment of the single-sided display case built in accordance with the present invention.
Figure 17:
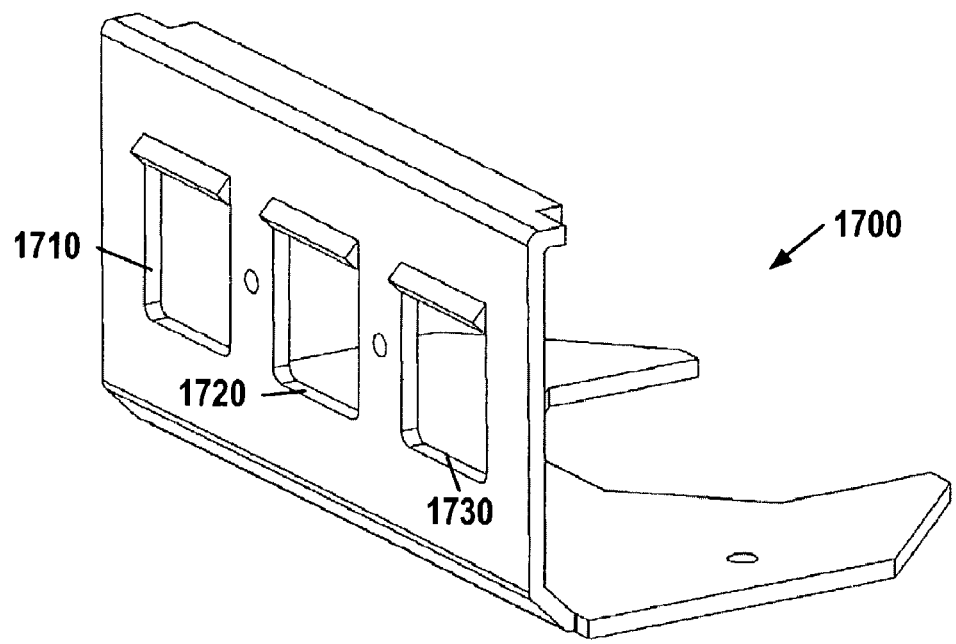
FIG. 17 is a perspective view of the bottom cover of the single-sided display case of FIG. 16, including push button holes.
Figure 18:
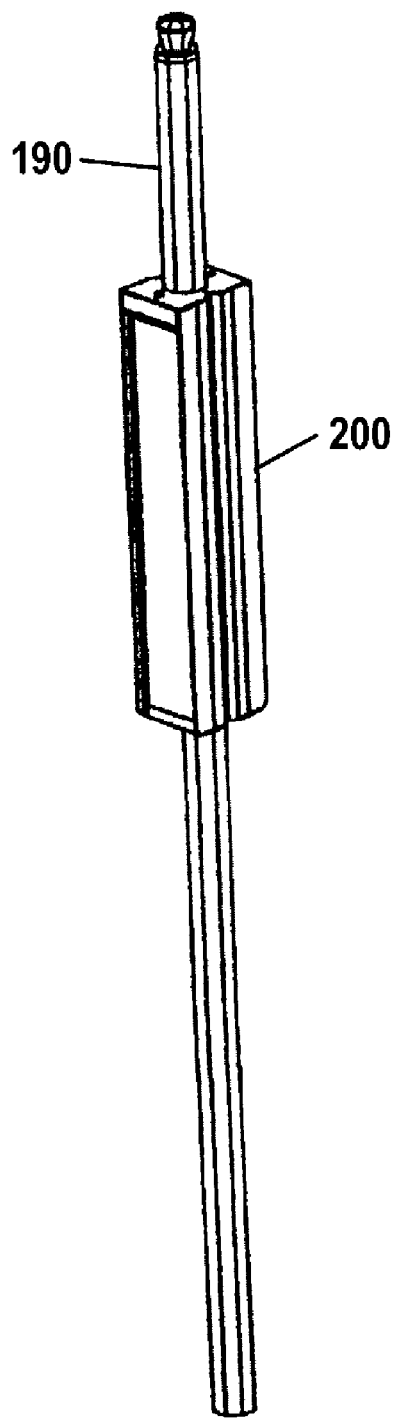
FIG. 18 is a perspective view of one embodiment of a double-sided display case built in accordance with the present invention.

The bottom cover 160 (FIG. 13) is secured to the rear interlocking frame member 120 via fasteners 164, 165, preferably self-tapping screws, which are inserted through mounting holes 161, 162 to engage the bottom of female connectors 1012, 1014. FIGS. 16–17 illustrate an alternative bottom cover 1700 embodiment for the display assembly 100. Cover 1700 includes one or more apertures 1710, 1720, 1730 to provide access to touch sensitive buttons that are optionally used to control the lighting systems or other electronic functions (not shown) of the display apparatus 100. For example, a first button may be used to provide backlighting for the display. A second button may be used to turn on environmental lighting for the area around the display. A third button might be used to turn on an alarm. Moreover, Braille lettering can be incorporated on the buttons or bottom cover 1700 to enable sight impaired sign users to utilize the buttons.

In one embodiment, one of the buttons operates a flashing signal to notify an approaching bus driver that there are people waiting to board the bus, such as described in U.S. Pat. No. 6,355,989 entitled "Public transportation signaling device" to Westcott, which is herein incorporated by reference. In a more preferable embodiment, other means, more sophisticated than a flashing light, and not comprehended within the disclosure of U.S. Pat. No. 6,355,989, are used to notify an approaching bus driver that there are people waiting to board the bus. For example, one of the buttons may cause a wireless signal to be transmitted to a receiving device, such as a pager, on board an approaching bus to notify the bus driver that patrons are waiting. Advantageously, a wireless signaling device, unlike the flashing light of U.S. Pat. No. 6,355,989, is easily detected during the day as well as night.

Bottom covers 160 and 1700 preferably include one or more ventilation slots 163, 164 that function, in conjunction with the ventilation port between the top edge 148 of window panel 140, to convect air through and transmit vapor away from the display cavity 875 between the display and window panels 130 and 140. Means are thereby provided for transmitting vapor out of the display cavity 875 that would otherwise fog the display panel 130 and/or window panel 140 and prevent proper use of the display apparatus 100.

The removable top plate or lid 170 (FIGS. 11–12) provides access to the graphics of display apparatus 100. Two guide pins 176, 177 protrude downwardly from the removable top plate 170 to engage the female connectors 1012, 1014 and keep the top plate 170 rigid and straight with respect to the front interlocking frame member 110. Additionally, a fastener, such as a conventional key-operated lock 172 with a tab 173, is provided to prevent unauthorized access to the display apparatus's graphics. As shown in FIG. 7, a slot 813 is provided to engage the tab 173 of the top plate's lock 172. A suitable lock for use with the illustrated embodiment is manufactured by the Illinois Lock Company of Wheeling, Ill., and identified by part number BC520S-VA-KA-0406/0425-N-K1. This particular brass-plated lock suitable for harsh weather environments.

The removable top plate or lid 170 also includes a downwardly extending lip 175 to shield the ventilation port between the top edge 148 of window panel 140 and the inside planar surface 178 of the top plate 170 from the elements. Incidentally, the top plate 170 and bottom cover 160 or 1700 are preferably made of 5052 aluminum sheet metal, although many other suitable materials are available.

Changing out a display panel 130 or window panel 140 merely requires removal of the top plate 170. After removing the top plate 170, the display panel 130 or window panel 140 is simply lifted up and away from the display assembly 100. Replacing a display panel 130 or window panel 140 merely requires the reverse of removing the display panel 130 or window panel 140.

In a preferred embodiment, support member 190 comprises an octagonal shaped sign post described in U.S. Pat. No. 5,848,502 and illustrated in Design Patent 415,847, both to Schaefer, both of which are herein incorporated by reference. Such posts, having about a 2-inch diameter, can be obtained from the assignee-at-issue of those patents, S-Square Tube Products of Commerce City, Colo. Such support members 190 are preferred because of their aesthetic qualities as well as their resistance to rotation, torsional strength, tamper resistant construction, and ease of installation and/or replacement. Such support members 190 are also preferred, when uniquely used throughout a locality for the locality's bus stops, because their undulating surface geometry conveniently enables sight-impaired individuals to identify the locality's bus stops. Nevertheless, it will be appreciated that the display assembly 100 is compatible for mounting on a wide variety of sign posts and support members. It will also be appreciated that with minor adaptations of the geometric and/or structural configuration of one or more of the interlocking frame members 110, 120, support brackets 150, lid 170, and bottom cover 160, display assembly 100 will be compatible with an even wider variety of support members.

In operation, the display apparatus 100 is installed onto an existing support member 190 by loosely securing the rear frame member 120 to the support brackets 150 using the appropriate fasteners 124. Next, the bottom cover 160 or 1700 is affixed to the front frame member 110 via self-tapping screws 164, 165 that are screwed into the bottom ends of female connectors 1012, 1014. Then, the front frame member 110 is slidably mated with the rear frame member 120 by inserting the male connectors 812, 814 into the female connectors 1012, 1014. Then, fasteners 124 are tightened to prevent further lateral movement of the front frame member 110 with respect to rear frame member 120. Next, the display and window panels 130 and 140 are installed in the front frame member 110. Finally, top cover 170 is placed on top of the interlocking frame members 110 and 120, so that guide pins 176, 177 of the top cover 170 penetrate into the top ends of female connectors 1012, 1014. The top cover 170 is finally secured be engaging the lock mechanism 172 so that tab 173 penetrates slot 813. It should be appreciated that some of these steps can be performed in a different order without departing from the scope of the present invention.

FIGS. 18–22 illustrate one embodiment of a double-sided information display assembly or case 200 designed and assembled in accordance with the present invention. Display assembly 200 comprises two interlocking main frame members 210, two interlocking side frame members 220, two display panels 230, two window panels 240, four support brackets 250, two bottom covers 260, and two top plates or lids 270. The two interlocking main frame members 210 are dimensioned and configured like the interlocking front frame member 110 described in connection with FIGS. 7–8. Likewise, the display panels 230 and window panels 240 are of the same type as described in connection with the display panel 130 and window panel 140 described above.

Figure 19:
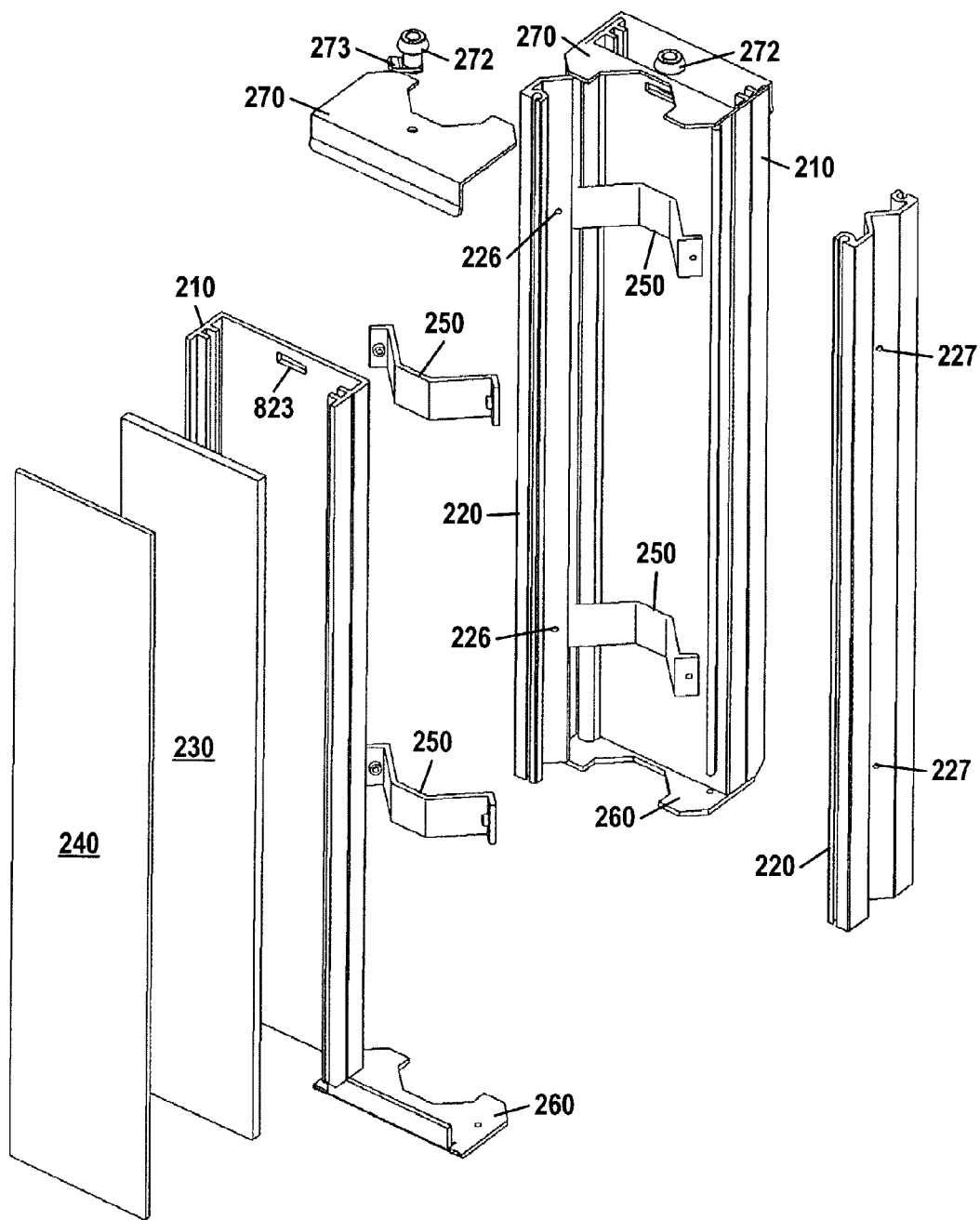
FIG. 19 is an exploded view of the double-sided display case of FIG. 18.
Figure 22:
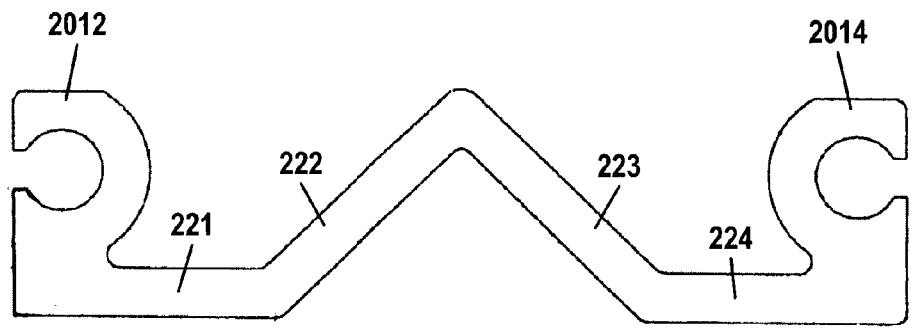
FIG. 22 is a cross-sectional end view of one the interlocking side frame member of the double-sided case of FIG. 17.

Interlocking side frame member 220, shown in greatest detail in FIGS. 19 and 22, comprises several planar portions 221, 222, 223, and 224 joined together in a manner forming two ridges separated by a groove. Adjoining planar portions 221 and 222 intersect to form a first ridge. Adjoining planar portions 223 and 224 intersect to form a second ridge. In between the two ridges, adjoining planar portions 222 and 223 intersect to form the groove.

Two female socket connectors 2012, 2014 project inwardly from the planar portions 221, 224. Connectors 2012, 2014 extend along the entire length (i.e., from top to bottom) of the side frame member 220. The connectors 2012, 2014 are dimensioned and shaped to interlock with the main frame member's male connectors (cf. 812, 814 of FIG. 8). In particular, the semi-cylindrical aperture formed within connectors 2012, 2014 has a radius of approximately 0.105 inches. This interlocking assembly enables frame members 210 and 220 to be fastened together to form a durable and strong self-supporting assembly.

The planar portions 223 and 224 of the side members 220 include fastener passages 226 and 227 for mounting the support brackets 250. Planar portions 223 and 224 are urged toward each other when the support brackets 250 wrapping around the support member 190 are mounted to the side frame members 220 and the fasteners securing the support brackets 250 are tightened. It should be noted that in the preferred embodiment, the tightening of such fasteners deforms the side frame members 220, including female connectors 2012 and 2014, enough to prevent disengagement of the main frame members 210 from the side frame member 220. Accordingly, in this embodiment it is important, before installing the main frame members 210 onto the side frame members 220, to refrain from over-tightening the fasteners. Of course, the fasteners 124 should be tightened after the main frame members 210 have been installed to prevent their disengagement from the side frame members 220.

In operation, the display apparatus 200 is installed onto an existing support member 190 by loosely securing the side frame members 220 to the support brackets 250 using appropriate fasteners inserted through fastener passages 256, 257 and corresponding fastener passages 226, 227. Next, the bottom covers 260 (or covers similar to the bottom covers 1700 shown in FIG. 17) are affixed to the main frame members 210 via self-tapping screws that are screwed into the bottom ends of female connectors 2012, 2014. Then, the main frame members 210 are slidably mated with the side frame members 220 by inserting the male connectors (cf. 812, 814 of FIG. 8) into the female connectors 2012, 2014. Next, the fasteners are tightened to prevent further lateral movement of the display apparatus 200 with respect to supporting member 190 and prevent lateral movement of the main frame members 210 with respect to side frame members 220. Then, the display and window panels 230 and 240 are installed in the main frame members 210. Finally, top covers 270 are placed on top of the interlocking frame members 210 and 220, so that guide pins (not shown) of the top covers 270 penetrate into the top ends of female connectors 2012, 2014. The top covers 270 are finally secured by engaging lock mechanisms 272 each having a tab 273 that penetrates a slot 823 of the corresponding main frame member 210. It should be appreciated that some of these steps can be performed in a different order without departing from the scope of the present invention.

A preferred embodiment of the present invention provides backlighting to the display panel 130. There are, of course, a variety of ways to backlight the display panel 130, some of which are described in U.S. application Ser. No. 09/867,143. One of the challenges involved in backlighting displays, and particularly edge-lit displays, is illuminating the displays evenly. This application discloses several novel and non-obvious embodiments to meet that challenge.

The presently most preferred embodiment for providing evenly diffused and adequate illumination is to obtain a display panel 130 comprised of a low-cost glassy thermoplastic such as acrylic or Plexiglas® having a preferred width of between 0.1 inches and the width of the display compartment 880, more preferably about ⅜ of an inch. Long, thin parallel strips of light-diffusing, light-reflecting, or opaque material, extending longitudinally along the length of the display panel 130, are affixed to the inside (i.e., back) surface of display panel 130. Each strip 130 has a preferable width of about 0.01 to 0.05 inches, more preferably about 0.03 inches. Moreover, the strips are preferably spaced about 0.05 to 0.2 inches apart, more preferably about 0.15 inches apart. Alternatively, the paint, ink or other opaque, light-diffusing, or light-reflecting material is applied to the display panel sufficient to cover approximately 10–30% of the inside surface of display panel 130, more preferably about 20% to 28% for a display panel that is about 2 feet long by 3⅜ inches wide. Furthermore, we have found that the longer the display panel 130, the smaller the ratio of paint coverage desired. Too much or too little coverage results in uneven lighting along the length of the display panel 130.

The display panel's edges, particularly the top and bottom edges, are preferably well polished so that when light is introduced into the display panel 130 through its top or bottom edge or both the top and bottom edges, a substantial portion of the light is reflected back into the panel 130 when the light reaches the opposite side(s).

The opaque material preferably comprises paint or glossy epoxy ink, but could alternatively comprise an adhesive. Preferably, the paint or ink is inexpensively applied to the inside surface of the display panel 130 using a reusable mask such as a silk screen. The mask or silk screen may be generated by drafting a mask design having the desired pin stripe dimensions on a computer, printing the mask design onto clear vinyl acetate board, stretching a piece of silk screen material tightly over a frame, placing the vinyl acetate board underneath and in contact with the silk screen material, dressing the silk screen with chemicals selected by one of ordinary skill in the art of silk screening, and applying intense light or heat to generate a chemical reaction to "burn in" the design from the vinyl acetate board into the silk screen. Thereafter, the silk screen is placed in contact with the display panel 130 and paint or ink is applied (e.g., by injection, spreading or scraping) to the silk screen. Where the artwork has been burned into the silk screen, paint or ink flows freely through the silk screen and onto the display panel 130.

A glossy backer, such as a bright white vinyl panel or board or glossy piece of paper, is placed in contact with the inside (i.e., back surface) of the display panel 130. The display graphics itself (e.g., a bus schedule) should be comprised of a thin translucent film or paper (not shown) such as vellum, which functions to diffuse the light. The display graphics should be placed in contact with the outside (i.e., front) surface of the display panel 130. The display panel 130, glossy backer, and display graphics are placed in the front interlocking frame member 110 between the flanges 834, 854 and the back portion 810. When installed, the striped surface of the display panel 130 should face the back portion 810, and the display graphics should face the display panel 140.

It is believed that this light-diffusing invention would be suitable for any back-lit display, including standard picture frames. For example, light emitting devices, such as LEDs, could be arranged in one or more edges of a picture frame having a display panel meeting the description above.

Figure 23:
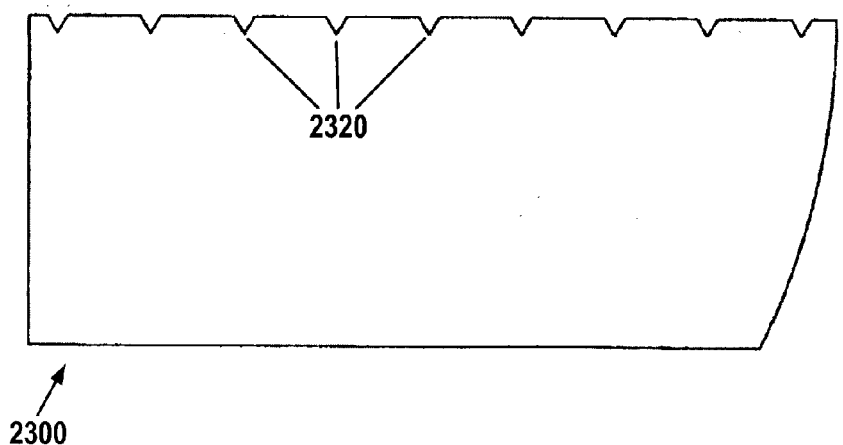
FIG. 23 is a partial cross-sectional view of one embodiment of an edge-lit display panel built in accordance with the present invention.

FIG. 23 illustrates a partial cross section of yet another embodiment of an edge-lit display panel 2300 built for use with the display apparatus of the present invention. The display panel 2300 is made of low-cost glassy thermoplastic such as acrylic or Plexiglas® having a preferred width of between 0.1 inches and the width of the display compartment 880, more preferably about ⅜ of an inch. The inside surface of display panel 2300 preferably includes several linear, parallel channel grooves or scratches 2320 extending longitudinally along the length of the window panel. Each groove 2320 has a preferable depth and width of about 0.01 to 0.05 inches, more preferably about 0.02 inches. Moreover, the grooves are preferably spaced about 0.05 to 0.2 inches apart, more preferably about 0.1 inches apart. Although not shown, the window panel's edges are preferably well polished so that when light is introduced into the window panel, a substantial portion of it is reflected back into the window when the light reaches the panel's edges.

The display panel's grooves 2320 may be formed in any suitable way, for example, through etching or molding. In one preferred embodiment, each of the window panel's grooves 2320 are formed by running a precision knife or utility blade across the length of the window panel. Even more preferably, each groove 2320 is formed by passing the knife in a single direction. Lights (not shown), such as high-efficiency white light emitting diodes, are placed near the bottom of interlocking frame member 110, adjacent the back portion 810, to introduce visible light into the display panel 2300 through the display panel's bottom edge. A portion of the light is then reflected back and forth between the edges of the display panel 2300. Another portion of the light escapes through grooves 2320 to evenly illuminate the display graphics.

A glossy piece of paper (not shown) should be placed in contact with the grooved surface of the display panel 2300. The display graphics itself (e.g., a bus schedule) should be comprised of a thin translucent film or paper (not shown) such as vellum which functions to diffuse the light. The display graphics should be placed in contact with the surface opposite the grooved surface of the display panel 2300. The display panel 2300, glossy backer, and display graphics are placed in the front interlocking frame member 110 between the flanges 834, 854 and the back portion 810. When installed, the grooved surface of the display panel 2300 should face the back portion 810, and the display graphics should face the display panel 140. The display panel 2300 is also preferably installed so that the direction in which the grooves 2320 were cut tends away from the illuminating light source.

Yet another edge-lighting, light diffusing embodiment uses a reflective film as a backing to an acrylic panel on which a clear or translucent display graphic is mounted. For example, 3M markets a reflective film product under the trademark Scotchlite™, which contains small reflectorized elements to make graphics highly visible at nighttime by reflected light. The reflective film is fairly effective in evenly illuminating the display when edge light sources are used to introduce light into the acrylic panel.

Yet another embodiment for an edge-lighted display utilizes a thermoplastic material, such as acrylic, interspersed with a light-diffusing additive. A potentially suitable light-diffusing acrylic material is marketed under the trademark ELiT™.

Yet another embodiment for backlighting utilizes a photoluminescent material that is charged by sunlight and which can glow for up to eight hours at night. Whether used in combination with or as an alternative to edge lighting, the luminescent backer embodiment advantageously yields energy savings.

Figure 24:
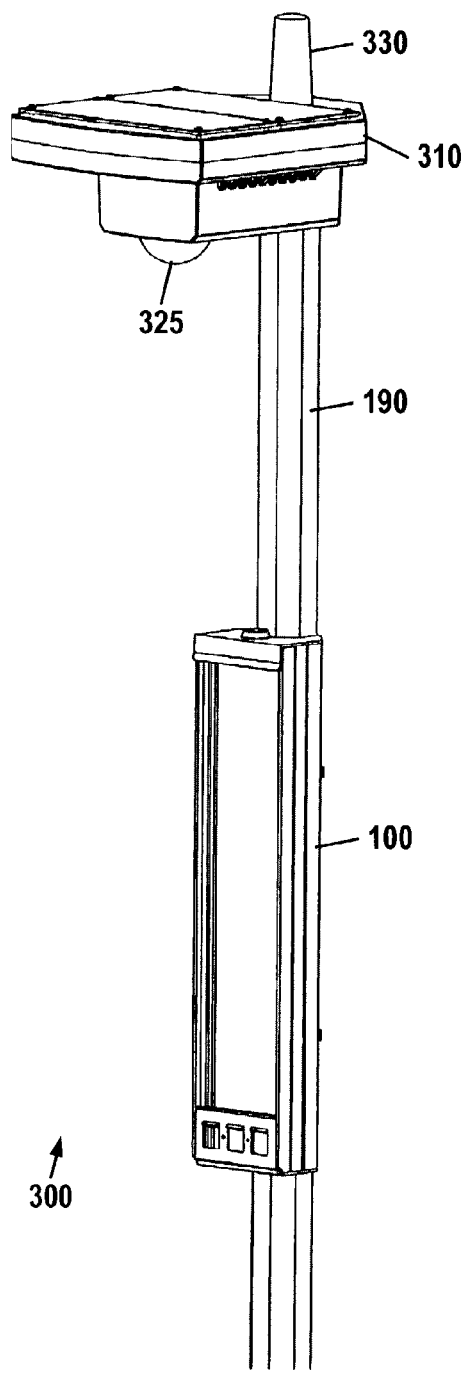
FIG. 24 is an elevated perspective view of one embodiment of a transportation node apparatus comprising an information display assembly and an overhead light assembly.
Figure 25:
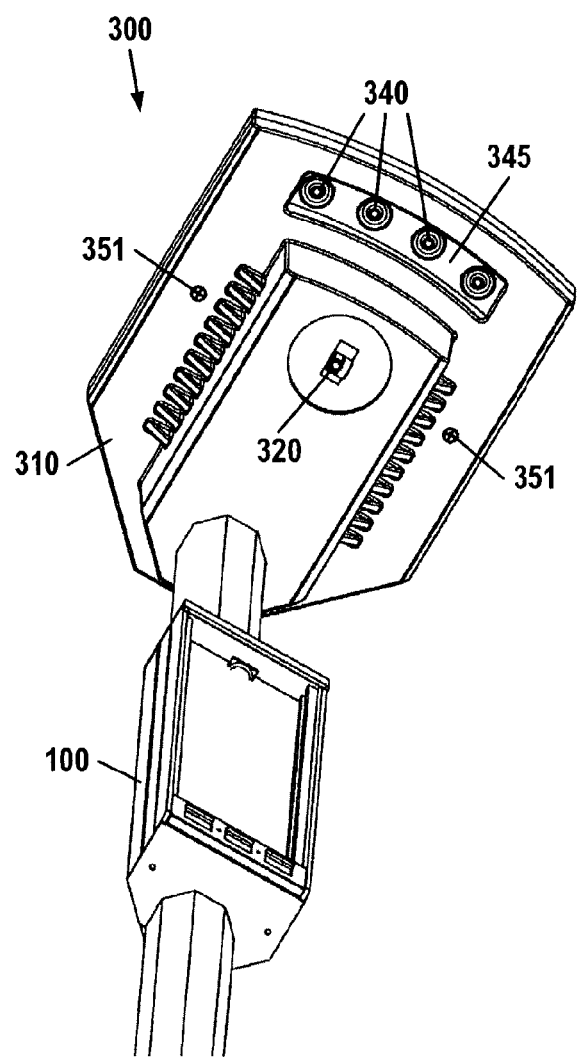
FIG. 25 is a bottom-up perspective view of the transportation node apparatus of FIG. 24.
Figures 29, 30:
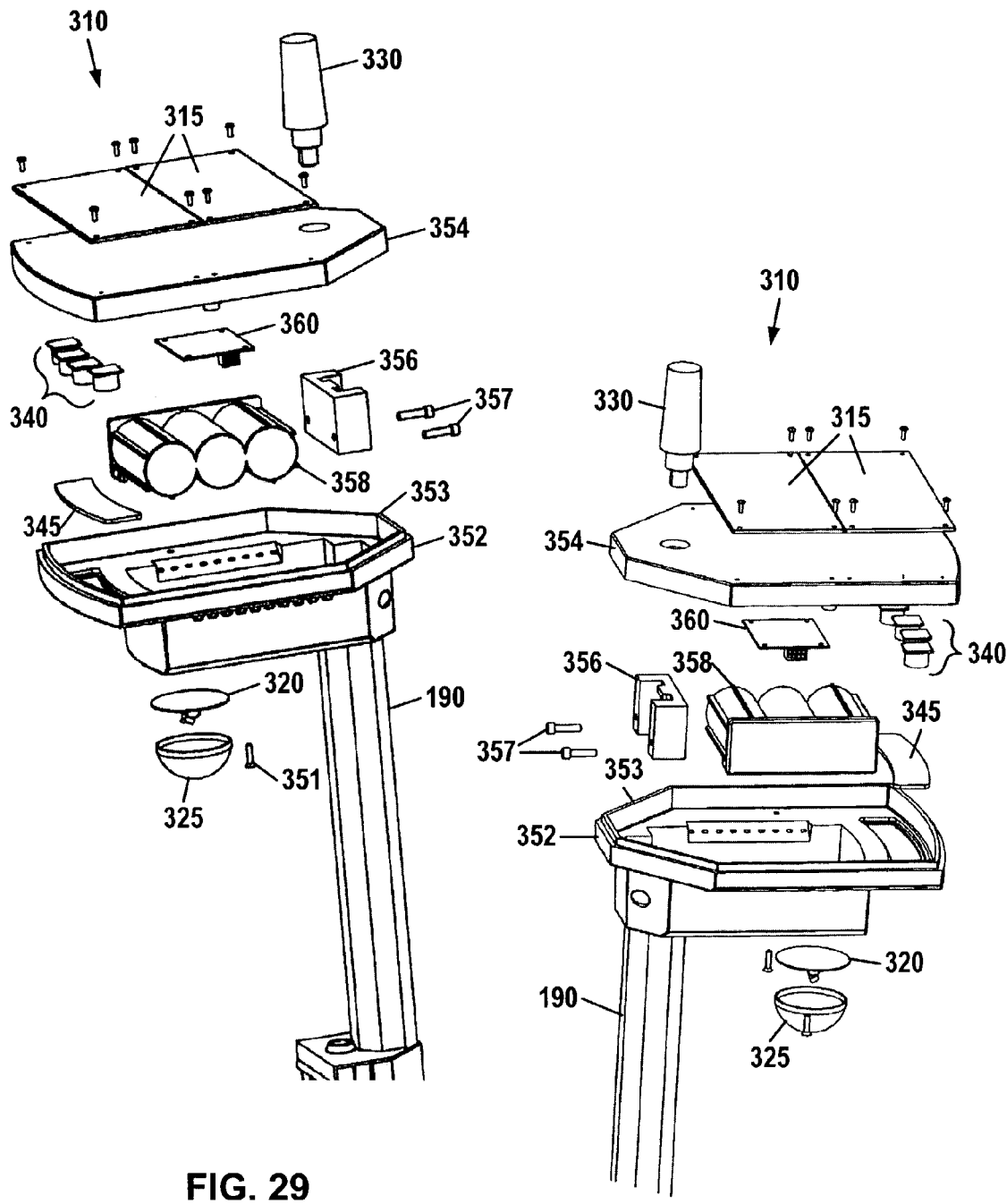
FIG. 29 is an exploded view of the overhead light assembly of FIG. 26.
FIG. 30 is another exploded view of the overhead light assembly of FIG. 26.
Figure 31:
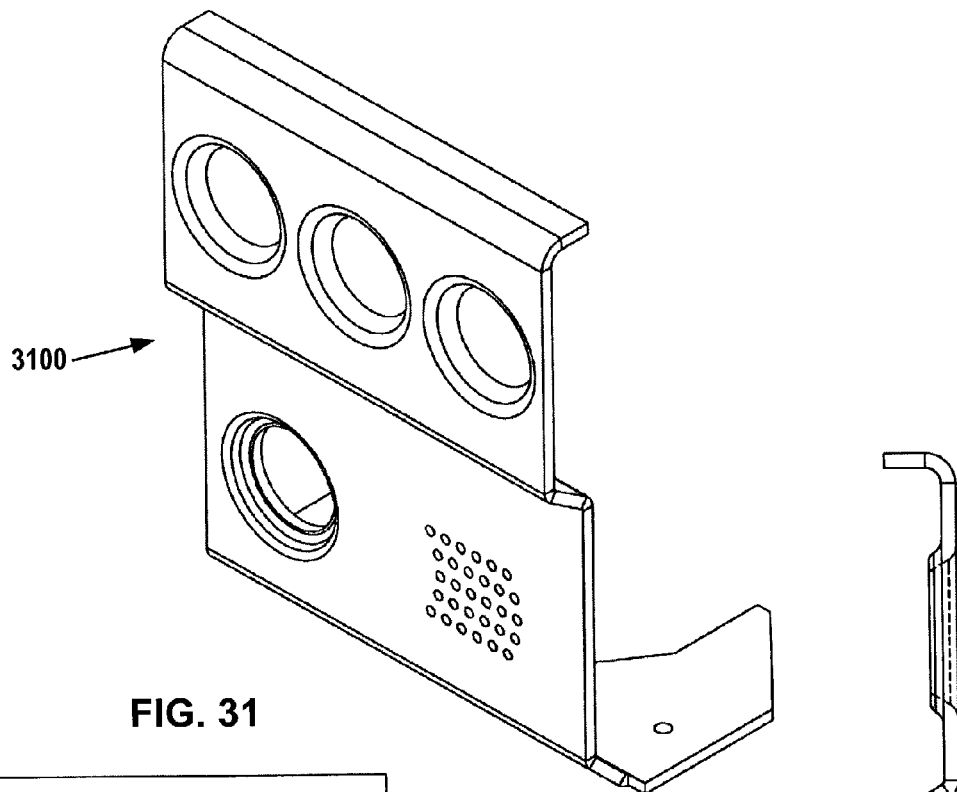
FIG. 31 is a perspective view of a face plate for an information display assembly comprising cell phone capabilities.
Figure 32:
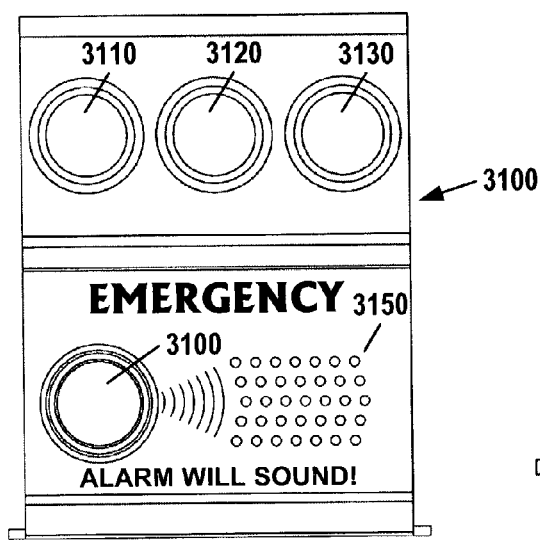
FIG. 32 is a frontal view of the face plate of FIG. 31 superimposed with exemplary labeling.

FIGS. 24–30 depict additional embodiments of a transportation node apparatus 300 comprising a user-operated overhead assembly or module 310. FIGS. 24–25, in particular, depict a transportation node apparatus 300 comprising an information display assembly 100 in combination with an overhead assembly 310. FIGS. 26–30 provide additional views of the overhead light assembly 310.

In a preferred embodiment, the overhead assembly 310 provides overhead illumination to cast an arc of light onto the ground, and any structures such as benches superimposed thereon, below. The overhead assembly 310 may optionally also, or in the alternative, provide overhead video or still-frame camera surveillance to increase transportation patron security.

As shown in FIGS. 24–30, the overhead assembly 310 comprises a main housing 352 and a lid 354. Main housing 352 is frictionally mounted to the support member 190 with a pole clamp 356 and two screws 357. The lid 354 fits over lip 353 of main housing 352 and is held in place, but removably so, by screws 351.

The main housing 352 provides space for a power supply 358, lights 340, which preferably comprise efficient and durable high intensity light emitting diodes (LEDs), and an optional protective lens 345. The power supply 358 preferably comprises a rechargeable battery pack. Solar panels 315 may be affixed to the lid 354. A circuit board 360 is provided to, among other optional functions, enable or disable the lights 340 and the recharging of the power supply 358.

In the advanced embodiment depicted in FIGS. 24–30, the overhead assembly 310 provides not only downlighting, but also camera surveillance and a communications antenna 330. A camera 320 covered by a semispherical protective guard 325 enables still frames or motion video of the scene below to be captured. The circuit board 360 also controls the operation of the camera 320.

It will be understood that just as the present invention is broad enough to extend to transportation node apparatuses covering only the claimed display apparatus, it is also broad enough to extend to transportation node apparatuses comprising a user-operated overhead assembly or module 310 that provides only one, or a subcombination, of these conveniences.

FIGS. 31–33A depict an embodiment of a face plate 3100 for use with the display assembly 100 comprising cell phone capabilities. Face plate 3100 preferably substitutes for the bottom cover 1700 depicted in FIGS. 16–17. Face plate 3100 provides one or more apertures 3115, 3125, 3135, and 3145 through which touch sensitive buttons 3110, 3120, 3130, and 3140 protrude.

As suggested in connection with FIGS. 16–17, one of the buttons 3110, 3120 and 3130 is preferably used to illuminate the display for a predetermined period of time such as 30 seconds. A second button is preferably used to illuminate the environment, or, more particularly, to activate the overhead lighting of the overhead assembly 310. A third button, if provided, may be used for any intended purpose. In one embodiment, a third button is used to activate circuitry providing an audible report of the expected time-to-arrival of the next bus for each of the bus routes serving the bus stop. In another embodiment, the third button causes the overhead illumination to flash on and off. In yet another embodiment, the third button transmits a signal to an approaching bus driver or to a centralized dispatch system that a patron is waiting to be picked up. Such a signal may comprise a light pointed in the direction of an approaching driver. More preferably, such a signal would comprise a wireless signal to activate a receiver, such as a paging device, in a nearby transit vehicle.

Face plate 3100 also provides a distress button, pull ring, or other actuating device 3140 and apertures 3150 for a cell phone speaker and microphone to notify transportation or public safety officials of an emergency. In this embodiment, the transportation node apparatus 300 optionally comprises portions of embodiments, or adaptations thereof, of the emergency notification systems and methods disclosed in U.S. patent application Ser. No. 60/419,889, entitled TRANSPORTATION NOTIFICATION, EMERGENCY RESPONSE, AND SURVEILLANCE SYSTEM, and filed by Alan L. Bartlett on Oct. 21, 2002, which is herein incorporated by reference. To discourage patrons from unnecessarily triggering the actuating device 3140, adhesive labeling is affixed to the face plate 3100 describing the nature of the actuating device 3140.

Figure 33:
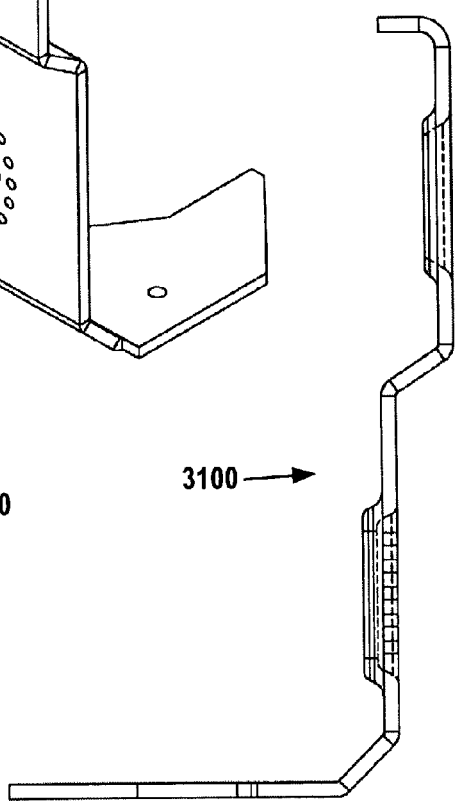
FIG. 33 is a cross sectional side view of FIG. 31.
Figure 33A:
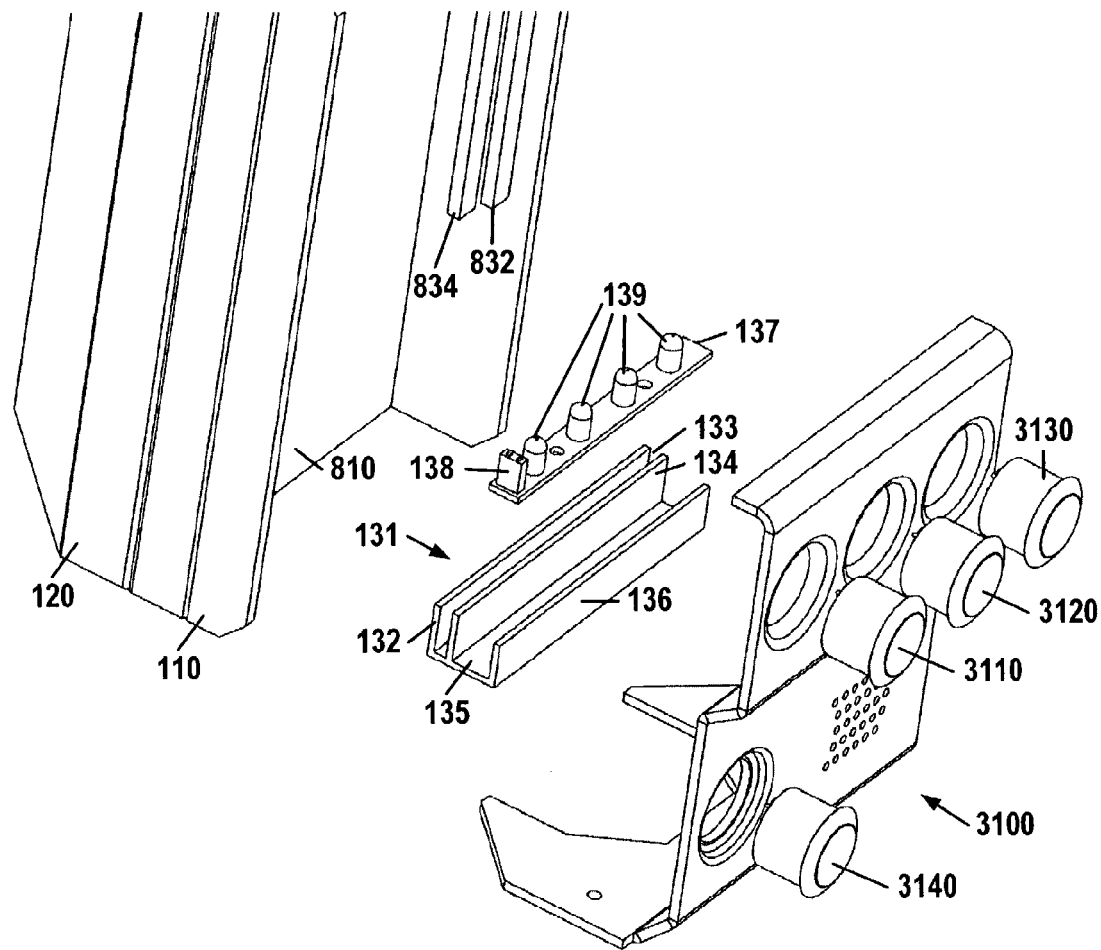
FIG. 33A is an exploded perspective view of the face plate of FIG. 31 in relation to the display panel edge lights, edge light bracket, and the display assembly.

FIG. 33A depicts an exploded perspective view of the face plate 3100 in relationship to interlocking frame members 110 and 120 of the display assembly 100, an edge light assembly 137, and an edge light assembly bracket 131. The edge light assembly 137 preferably comprises a plurality of board-mounted, energy-efficient, durable, high-intensity solid state white LEDs 139, but may of course comprise any other suitable form of light emitter, including incandescent bulbs, fluorescent bulbs, and the like. We have found that four LEDs is suitable for a three-to-four inch wide display panel 130, and that six LEDs is more suitable for a five-to-six inch wide display panel 130. An electrical connector 138 is provided to connect the LEDs 139 to a switch-controlled or electric-circuit-controlled power source.

The edge light assembly bracket 131 comprises three fins 132, 134, and 136 forming two parallel slots 133 and 135. Fins 132 and 134 are adapted to clip onto the back portion 810 of the frame member 110, which fits into slot 133. Slot 135 is adapted to bracket both the light assembly 137 and the display panel 130 (and any accompanying display graphics and display panel backing).

Figure 34:
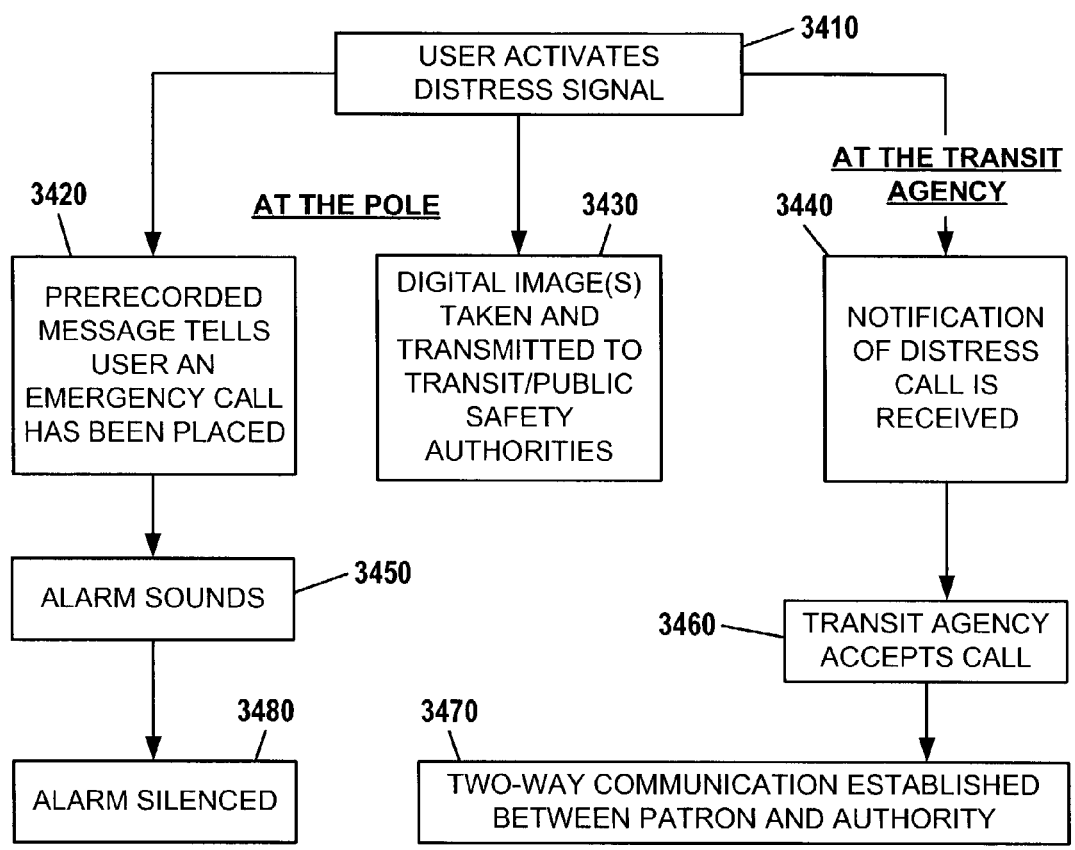
FIG. 34 depicts a flow chart of one embodiment of an emergency response system and method for use with the present invention.

FIG. 34 depicts a flow chart of one embodiment of an emergency response system and method 3400 for use with the present invention. In step 3410, a transportation node patron activates a distress signal via the actuating device 3140. In step 3420, a prerecorded message is played at the transportation node telling the patron that an emergency call is being placed. After the prerecorded message has been played, in step 3450, an alarm sounds. Meanwhile, in step 3430, camera 320 captures one or more digital images, circuit board 360 processes the images, and antenna 330 transmits the images to transit or public safety officials. Also meanwhile, in step 3440, a phone or distress signal receiver at the transit or public safety agency rings or signals that a distress call has been placed at the transit node. In step 3460, the transit or public safety agency accepts the distress call, and in step 3470 a two-way voice connection is established between the agency and the transportation node, preferably via a cell phone apparatus housed inside or adjacent to the information display apparatus 100.

Once the two-way voice connection has been established, in step 3480 the alarm at the transportation node is terminated to facilitate communications between transit or public safety officials and the patron. The patron is able to communicate the problem and the transit or public safety authority may respond appropriately. Alternatively, if an attack is in progress, the transit or public safety official can both see the transmitted images and hear the sounds transmitted by the cell phone apparatus.

Figure 35:
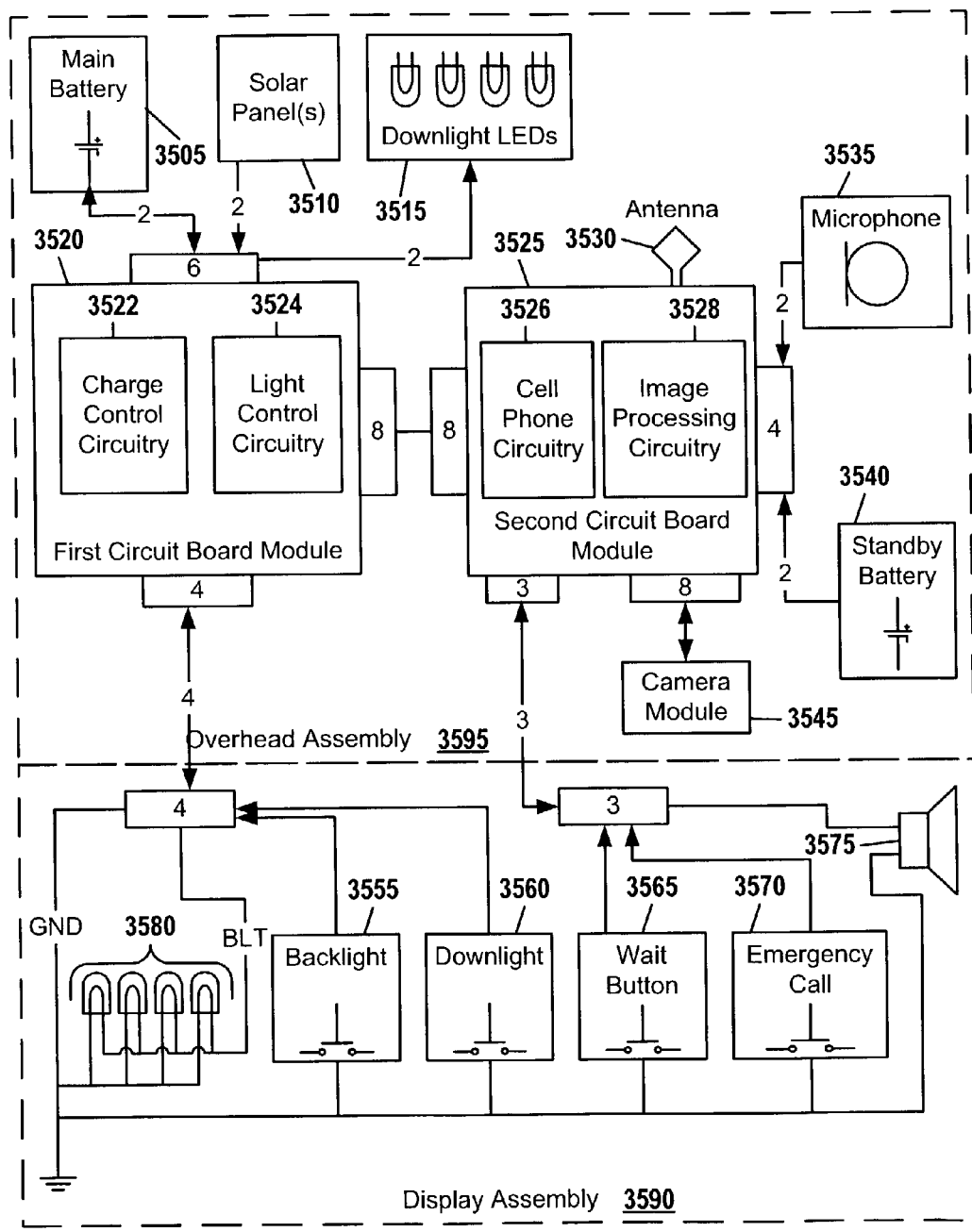
FIG. 35 is a schematic diagram of one embodiment of a transportation node apparatus providing a backlit information display, overhead illumination, security camera, and cell phone communications.

FIG. 35 is a schematic diagram of one embodiment of a transportation node apparatus providing a backlit information display, overhead illumination, security camera, and cell phone communications. A main battery 3505, solar panel 3510, downlight LEDs 3515, and a first circuit board module 3520 are housed in the overhead assembly 3595. The first circuit board module 3520 comprises charge control circuitry 3522 to limit discharge of battery 3505 and to prevent overcharging by solar panel 3510. The first circuit board module 3520 also comprises programmable light control circuitry 3524 to control the timing and duration of overhead illumination and display illumination. For example, light control circuitry 3524 is preferably programmed to prevent downlight LEDs 3515 and backlight LEDs 3580 from operating during daylight hours, or, alternatively, when the light control circuitry 3524 detects adequate ambient illumination based on charge received from solar panels 3510. The first circuit board module 3520 is operatively coupled to a backlight button 3555, a downlight button 3560, and backlight LEDs 3580, which are housed in the display assembly 3590.

A second circuit board module 3525, a standby battery 3540, a camera module 3545, a microphone 3535, and an antenna 3530 are also mounted on or housed inside the overhead assembly 3595. The second circuit board module 3525 has cell phone control circuitry 3526 to operate the cell phone microphone 3535 and speaker 3575. The second circuit board module 3525 also has image processing circuitry 3528 communicatively coupled with a camera module 3545. The image processing circuitry 3528 is preferably operable to store up to 15 minutes or more of video images so that investigators can view scenes leading up to a distress call. In a preferred embodiment, the image processing circuitry 3528 can also be activated remotely—not just by a distress signal—to capture and transmit images.

The second circuit board module 3525 is operatively coupled to wait button 3565 and emergency distress actuator 3565, which are housed in the display assembly 3590. A rechargeable standby battery 3540 is preferably provided in operative communication with the second circuit board module 3525, so that transit authorities are automatically notified of main battery 3505 failure, and so that patrons can still place distress calls in the event of main battery 3505 failure.

Although the foregoing specific details describe various embodiments of the invention, persons reasonably skilled in the art will recognize that various changes may be made in the details of the apparatus of this invention without departing from the spirit and scope of the invention as defined in the appended claims. Therefore, it should be understood that, unless otherwise specified, this invention is not to be limited to the specific details shown and described herein.

We claim:

1. A transit stop apparatus comprising:
   a transit stop post;
   an overhead assembly mounted on the post;
   a first set of one or more light emitters mounted within the overhead assembly and oriented to project the emitted light toward the ground in the immediate vicinity of the transit stop apparatus;
   a display panel mounted on the post, the display panel being adapted to provide static transportation-related information to persons at the transit stop;
   a second set of one or more light emitters mounted inside the display panel and oriented to illuminate the static transportation-related information on the display panel;
   one or more user-operated switches mounted on the display panel that enable the user to activate the first and second sets of one or more light emitters;
   a rechargeable battery;
   a solar energy collector;
   electrical circuitry connecting the solar energy connector to the rechargeable battery, the one or more user-operated switches, and the first and second sets of light emitters in a manner adapted to enable solar charging of the battery and to turn on the first and second sets of light emitters upon user activation of the one or more user-operated switches.

2. The transit stop apparatus of claim 1, further comprising a light control circuit operatively connected to the battery, and first set of one or more light emitters, and programmed to turn off the first set of one or more light emitters after a finite period of illumination has elapsed.

3. The transit stop apparatus of claim 2, wherein the light control circuit detects ambient illumination from the solar energy connector and prevents activation of the first set of one or more light emitters when the ambient illumination exceeds a predetermined threshold.

4. The transit stop apparatus of claim 1, further comprising: a light control circuit programmed to flash the first set of light emitters on and off repeatedly for a finite period of time; wherein the electrical circuitry connects the light control circuit, and the first set of light emitters in a manner adapted to cause the light emitters to be flashed on and off upon user activation of at least one of the one or more user-operated switches.

5. The transit stop apparatus of claim 1, further comprising: a transportation signaling transmitter operable to broadcast an invisible wireless signal to a receiver mounted on a transportation vehicle; wherein the electrical circuitry connects at least one of the one or more user-operated switches with the transportation signaling transmitter to enable a user to transmit a signal to a driver of a transportation vehicle and thereby alert the driver that the user is waiting to be picked up.

6. The transit stop apparatus of claim 1 further comprising:
- a wireless two-way voice transceiver;
- an antenna for receiving and transmitting signals to and from the transceiver; and
- an additional user-operated switch mounted on the post that enables a user to activate the wireless two-way voice transmitter and receiver;
- the electrical circuitry further connecting the transceiver, additional user-operated switch, and antenna in a manner adapted to enable two-way communication upon user activation of the additional user-operated switch.

7. A transit stop apparatus comprising:
- a transit stop post;
- an overhead assembly mounted on an upper portion of the post;
- a display assembly mounted on the post below the overhead assembly, the display assembly comprising one or more display panels providing a display surface for displaying static transportation-related information;
- the display assembly further comprising a plurality of interlocking frame members adapted to wrap around the transit stop post wherein:
- the plurality of interlocking frame members includes a first interlocking frame member having a male connector and a second interlocking frame member having a corresponding female connector, the first interlocking frame member being adapted to interlock with the second interlocking frame member by inserting the male connector into the female connector; and
- one or more of the plurality of interlocking frame members include compartments for holding the display panels;
- a light emitter mounted on the display assembly and oriented to cast light upon the display surface of the display assembly;
- a rechargeable battery operable to provide power to the light emitter;
- a solar panel mounted to the overhead assembly operable to recharge the battery; and electrical circuitry connecting the solar panel, rechargeable battery, and light emitter in a manner adapted to enable illumination of the display panel.

8. The transit stop apparatus of claim 7, wherein at least one of the one or more display panels is a transparent display panel having an inside surface and an outside surface, the display assembly further comprising:
- a thin translucent sheet with printed information, the translucent sheet overlaying the outside surface of the transparent display panel;
- wherein the light emitter is oriented along an edge of the display panel to project light onto the transparent display panel.

9. The transit stop apparatus of claim 8, wherein the transparent display panel has highly polished top and bottom edges.

10. The transit stop apparatus of claim 9, further comprising parallel light reflecting means for illuminating the thin translucent sheet, the parallel light reflecting means being disposed on the inside surface of the display panel and extending between the top and bottom edges of the display panel.

11. The transit stop apparatus of claim 7, further comprising:
- a second set of light emitters mounted within the overhead assembly and oriented to project the emitted light toward the ground in the immediate vicinity of the transit stop apparatus; and
- a user-operated switch mounted on the display panel that enables a user to activate the second set of light emitters;
- wherein the electrical circuitry also connects the rechargeable battery, the second set of light emitters, and the user-operated switch in a manner adapted to allow the second set of light emitters to be turned on upon user activation of the switch.

12. The transit stop apparatus of claim 11, further comprising:
- a second user-operated switch mounted on the display assembly; and
- a light control circuit programmed to flash the second set of light emitters on and off repeatedly for a finite period of time;
- wherein the electrical circuitry connects the second user-operated switch, the light control circuit, and the second set of light emitters in a manner adapted to cause the light emitters to be flashed on and off upon user activation of the second user-operated switch.

13. The transit stop apparatus of claim 7, further comprising:
- a transportation signaling device mounted in the overhead apparatus and operable to provide a signal to a driver of a transportation vehicle; and
- a user-operated switch mounted on the display apparatus;
- wherein the electrical circuitry connects the user-operated switch with the transportation signaling device to enable a user to alert a driver of a transportation vehicle that the user is waiting to be picked up.

14. The transit stop apparatus of claim 7, further comprising:
- a camera mounted in the overhead assembly and operable to capture images of the area below the overhead assembly and in the immediate vicinity of the transit stop apparatus; and
- a wireless communication circuit coupled to the camera and operable to transmit images captured by the camera.

15. The transit stop apparatus of claim 7, wherein each interlocking frame member is formed of an extruded material.

16. The transit stop apparatus of claim 7, wherein the male and female connectors each have an elongate longitudinal dimension extending from a point at or near the top of the corresponding frame member to a point at or near the bottom of the corresponding frame member, so that the first interlocking frame member is adapted to be connected to the second interlocking frame member by sliding the male connector into the female connector along a longitudinal axis of the display apparatus.

17. The transit stop apparatus of claim 7, further comprising:
- a first set of fastener passages disposed in one of the interlocking frame members;
- a support bracket having a second set of fastener passages dimensioned to align with the first set of fastener passages; and a plurality of fasteners adapted to be inserted through the first and second sets of fastener passages to join the support bracket to the interlocking frame member in which the first set of fastener passages is disposed.

18. The transit stop apparatus of claim 17, wherein the support bracket is dimensioned to partially wrap around, press against, and frictionally engage the support member when fastened to the interlocking frame member in which the first set of fastener passages is disposed, so that when fastened, movement of the display apparatus with respect to the support member is impeded.

* * * * *